(12) United States Patent
Yang et al.

(10) Patent No.: US 12,376,112 B2
(45) Date of Patent: Jul. 29, 2025

(54) UCI MULTIPLEXING FOR DIFFERENT LEVELS OF RELIABILITY

(71) Applicant: QUALCOMM Incorporated, San Diego, CA (US)

(72) Inventors: Wei Yang, San Diego, CA (US); Yi Huang, San Diego, CA (US); Hwan Joon Kwon, San Diego, CA (US); Runxin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 17/657,945

(22) Filed: Apr. 4, 2022

(65) Prior Publication Data

US 2022/0330231 A1   Oct. 13, 2022

Related U.S. Application Data

(60) Provisional application No. 63/171,074, filed on Apr. 5, 2021, provisional application No. 63/171,062, filed on Apr. 5, 2021.

(51) Int. Cl.
*H04W 72/21* (2023.01)
*H04L 5/00* (2006.01)
*H04W 72/56* (2023.01)

(52) U.S. Cl.
CPC ........... *H04W 72/21* (2023.01); *H04L 5/0048* (2013.01); *H04W 72/56* (2023.01)

(58) Field of Classification Search
CPC .... H04W 72/21; H04W 72/56; H04L 5/0048; H04L 27/2636; H04L 27/2602; H04L 5/0051; H04L 5/0053; H04L 5/006
See application file for complete search history.

(56) References Cited

U.S. PATENT DOCUMENTS

| | | | | |
|---|---|---|---|---|
| 2016/0028518 | A1* | 1/2016 | Zhao | H04L 1/0088 370/330 |
| 2019/0037585 | A1* | 1/2019 | Li | H04L 1/0071 |
| 2019/0045536 | A1* | 2/2019 | Gao | H04L 5/0048 |
| 2019/0150132 | A1* | 5/2019 | Bala | H04L 27/0008 370/329 |
| 2019/0356446 | A1* | 11/2019 | Kim | H04L 5/0053 |
| 2020/0077370 | A1* | 3/2020 | Qu | H04L 5/0048 |
| 2020/0107317 | A1* | 4/2020 | Ryu | H04L 5/0051 |

(Continued)

*Primary Examiner* — Malick A Sohrab
(74) *Attorney, Agent, or Firm* — Procopio, Cory, Hargreaves & Savitch LLP

(57) ABSTRACT

A method, apparatus, and computer-readable medium for wireless communication at a user equipment (UE). The UE encodes a first uplink control information (UCI) payload of a first priority level to generate a first codeword. The UE modifies the first codeword based on a second UCI payload, wherein information about the second UCI payload is conveyed via a modification of the first codeword. The UE transmits an uplink channel comprising the first codeword and carrying information for the second UCI payload. A base station receives an uplink channel from the UE, comprising a first codeword for a first UCI payload having a first priority level and having a modification that conveys information for a second UCI payload having a second priority level. The base station decodes the second UCI payload based at least in part on the information conveyed based on the modification.

30 Claims, 20 Drawing Sheets

(56) References Cited

U.S. PATENT DOCUMENTS

| | | | |
|---|---|---|---|
| 2020/0367265 A1* | 11/2020 | Wang | H04L 5/0055 |
| 2021/0045181 A1* | 2/2021 | Li | H04W 72/23 |
| 2022/0029753 A1* | 1/2022 | Papasakellariou | H04L 1/1861 |
| 2022/0078768 A1* | 3/2022 | El Hamss | H04W 72/21 |
| 2022/0104242 A1* | 3/2022 | Wu | H04L 1/1893 |

* cited by examiner

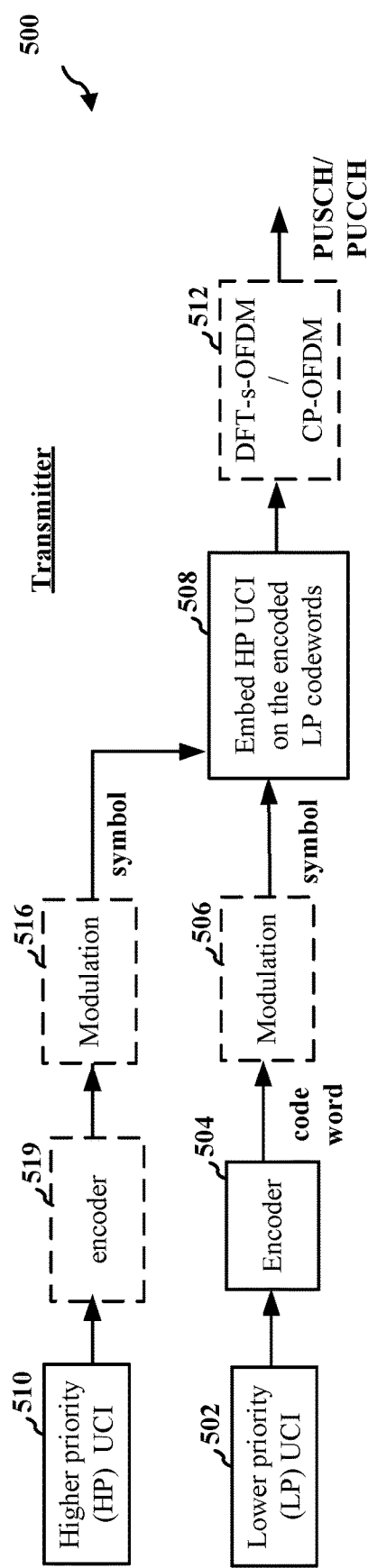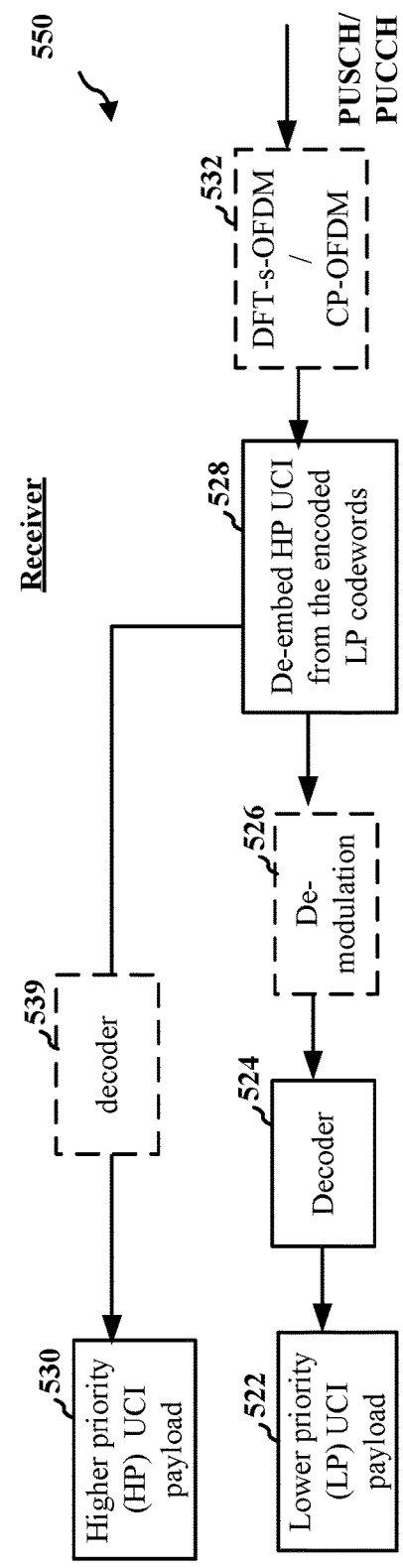
FIG. 5A
FIG. 5B

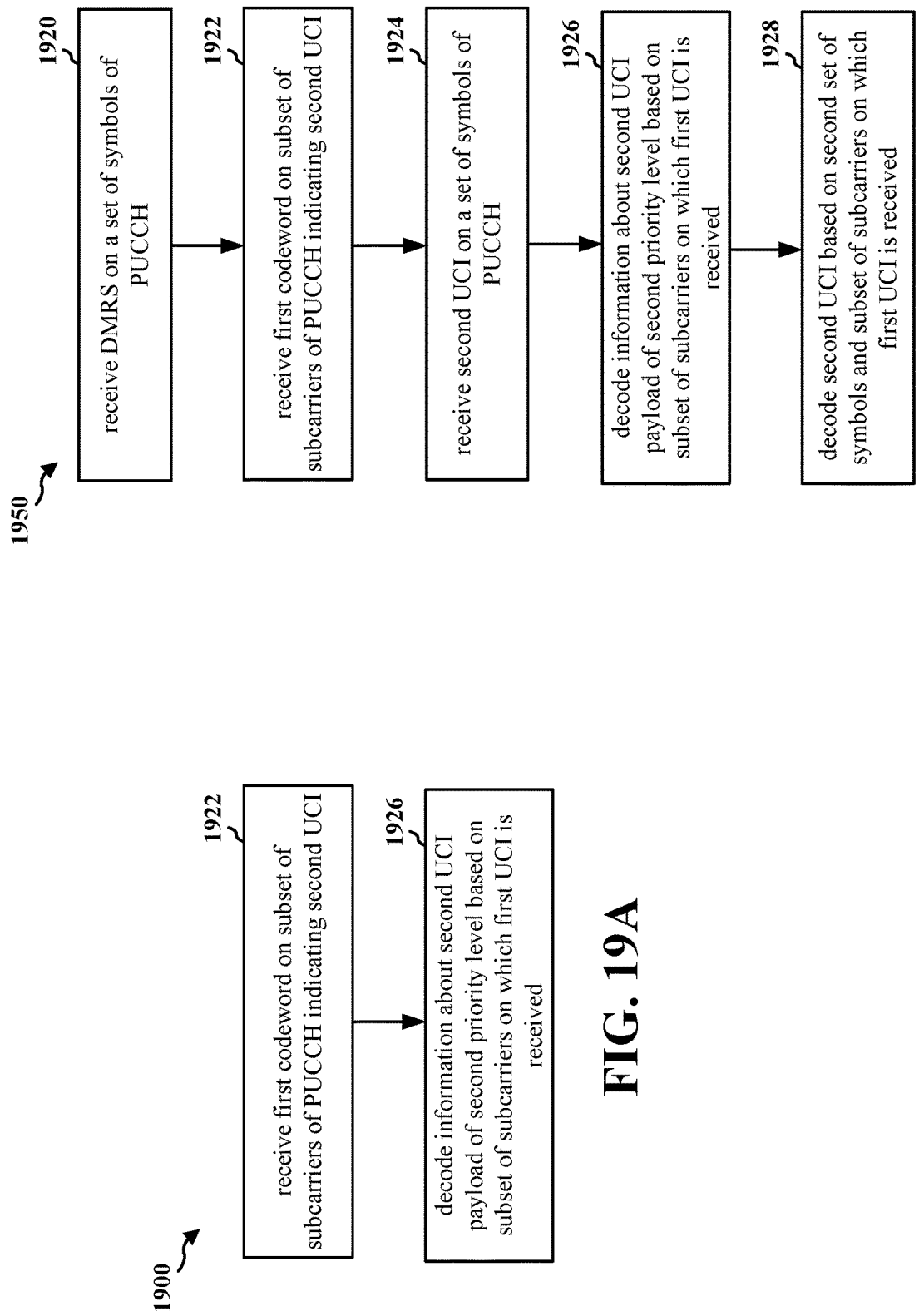

UCI MULTIPLEXING FOR DIFFERENT LEVELS OF RELIABILITY

CROSS REFERENCE TO RELATED APPLICATION(S)

This application claims the benefit of and priority to U.S. Provisional Application Ser. No. 63/171,062, entitled "UCI Multiplexing for Different Levels of Reliability" and filed on Apr. 5, 2021, and U.S. Provisional Application Ser. No. 63/171,074, entitled "Multiplexing UCI with Different Priorities" and filed on Apr. 5, 2021, the contents of both of which are expressly incorporated by reference herein in its entirety.

TECHNICAL FIELD

The present disclosure relates generally to communication systems, and more particularly, to wireless communication including payloads having different reliability requirements.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. In some aspects, the apparatus may be a user equipment (UE) or a component of a UE. The apparatus encodes a first uplink control information (UCI) payload of a first priority level to generate a first codeword. The apparatus modifies the first codeword based on a second UCI payload, wherein information about the second UCI payload is conveyed via a modification of the first codeword. The apparatus transmits an uplink channel comprising the first codeword and carrying the information for the second UCI conveyed based on a modification of the codeword.

In an aspect of the disclosure, a method, a computer-readable medium, and an apparatus are provided for wireless communication. In some aspects, the apparatus may be a base station or a component of a base station. The apparatus receives an uplink channel from the UE, comprising a first codeword for a first UCI payload having a first priority level and having a modification that conveys information for a second UCI having a second priority level. The apparatus decodes the second UCI based at least in part on the information conveyed based on the modification.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A illustrates a diagram for embedding information about a first UCI on a codeword for a second UCI, in accordance with various aspects of the present disclosure.

FIG. 5B illustrates a diagram for reception of UCI having embedded information for another UCI payload, in accordance with various aspects of the present disclosure.

FIG. 19A and FIG. 19B are flowcharts of methods of wireless communication at a base station, in accordance with various aspects of the present disclosure.

DETAILED DESCRIPTION

Figure 1:
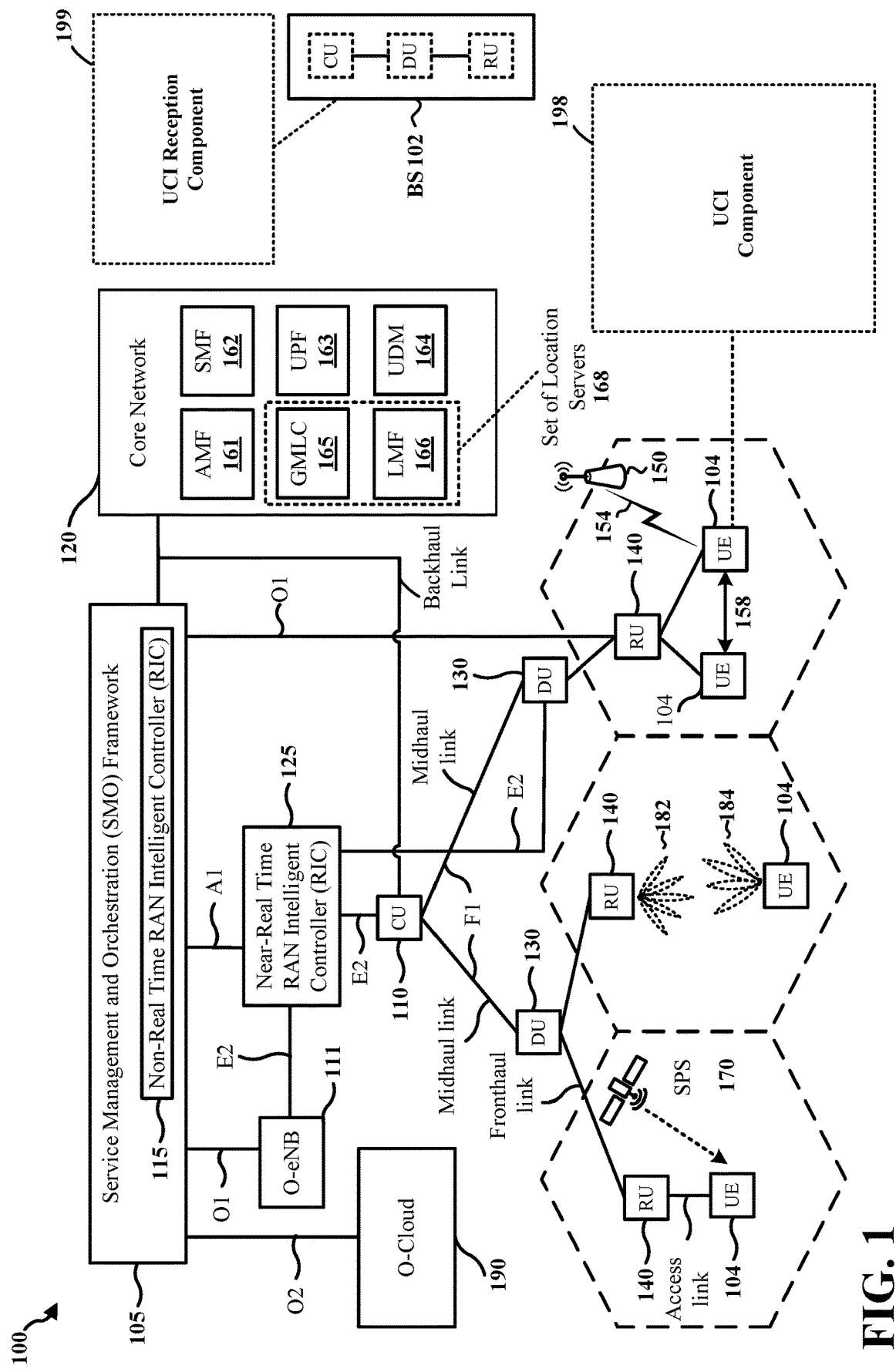
FIG. 1 is a diagram illustrating an example of a wireless communications system and an access network, in accordance with various aspects of the present disclosure.

A UE may exchange wireless traffic with a network, the traffic having different reliability or latency requirements. As non-limiting examples, lower priority traffic may include eMBB traffic, and higher priority traffic may include URLLC traffic. In some aspects, the UE may uplink control information that overlaps in time for the two different types of traffic. A UE may drop a lower priority uplink transmission that collides, e.g., would overlap in time, with a higher priority uplink transmission. In some aspects, UCI may overlap in time with a physical uplink control channel (PUCCH) transmission or physical uplink shared channel (PUSCH) transmission, and the UE may multiplex the UCI with the PUCCH or the PUSCH transmission. PUSCH or a PUCCH transmission, including repetitions if any, can be of priority index 0 or of priority index 1. Priority index 0 is also known as low priority, and priority index 1 is also known as high priority.

Aspects presented herein enable a UE to multiplex UCI having different priority levels by embedding information about a higher priority UCI payload on a codeword for a lower priority UCI payload. The UE may further multiplex a second codeword representing the higher priority UCI payload with the modified first codeword. The aspects presented herein may enable the UE to transmit information about both the higher priority UCI and the lower priority UCI without dropping the lower priority UCI. By embedding the information about the higher priority UCI on the codeword for the lower priority UCI, the UE may provide a higher level of protection to the higher priority UCI. A base station receiving the uplink transmission from the UE may determine the embedded information about the higher priority and may use the information to decode the second UCI payload.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

The UE 104 may encode a first UCI payload of a first priority level to generate a first codeword and may include a UCI component 198 configured to embed information for a second UCI payload of a second priority level with the first codeword. The UE 104 may be further configured to transmit an uplink channel comprising the first codeword having the embedded information for the second UCI payload. The base station 102 may receive the uplink channel from the UE 104, comprising a first codeword for a first UCI payload having a first priority level and having embedded information for a second UCI payload having a second priority level. The base station 102 may include a UCI reception component 199 that is configured to decode the second UCI payload based at least in part on the embedded information. In some aspects, the UE 104 may include a UCI component 198 configured to encode first UCI having a first priority level into a first codeword, and transmit the first codeword on a subset of subcarriers on a first set of one or more symbols of a PUCCH, where the first codeword indicates the first UCI, and the set of subcarriers indicate second UCI having a second priority level. In certain aspects, the base station 102 may include a UCI reception component 199 configured to receive first UCI of a first priority level on a subset of subcarriers in a first set of one or more symbols of a PUCCH, and decode information about second UCI payload of a second priority level based on the subset of subcarriers on which the first UCI is received. Although the following description provides example for UCI having different priority levels, the aspects may be similarly applied to other types of payloads having different reliability levels, and the concepts presented herein are not limited to application with UCI. Although the following description may be focused on 5G NR, the concepts described herein may be applicable to other similar areas, such as LTE, LTE-A, CDMA, GSM, and other wireless technologies.

Figure 2:
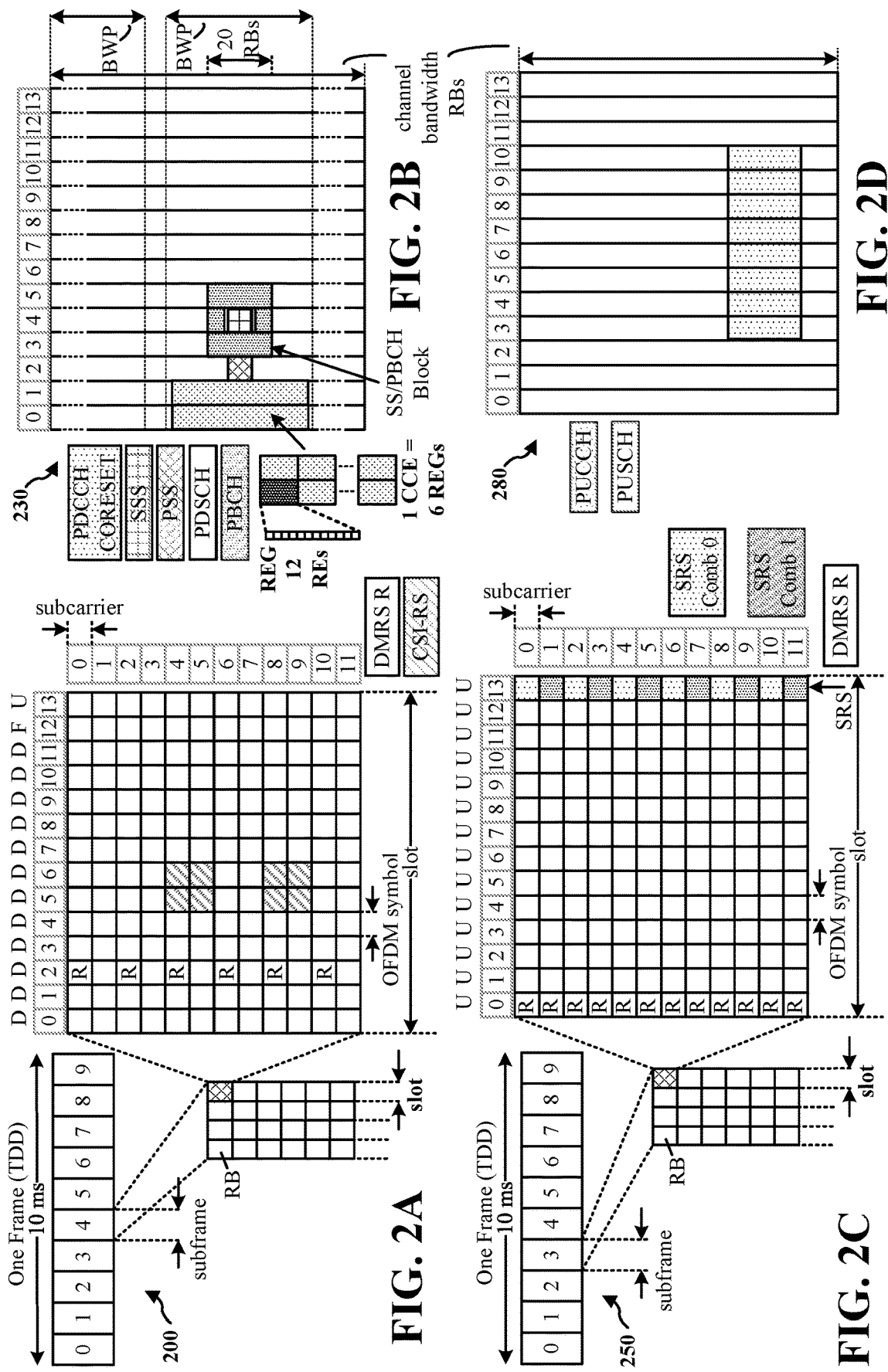
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
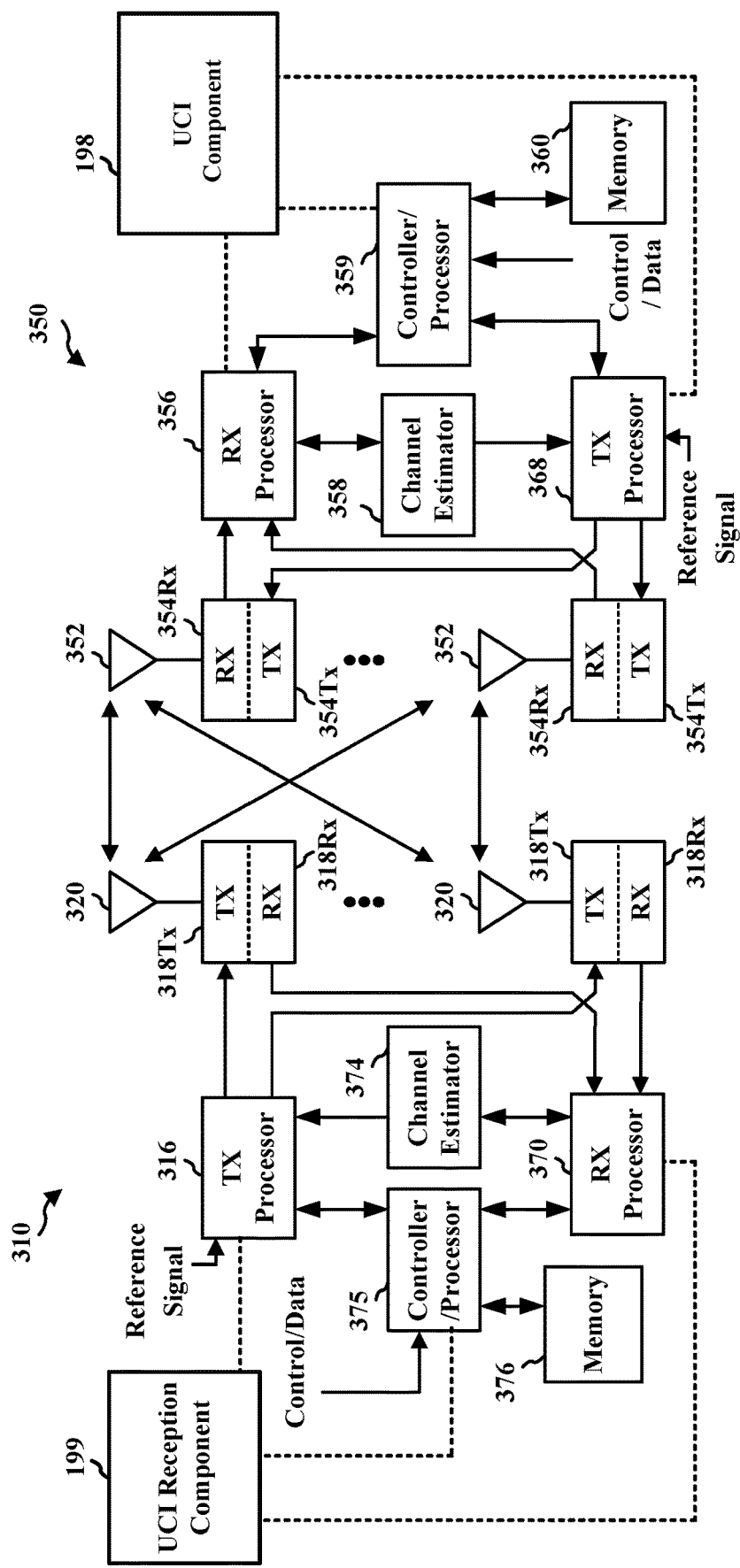
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the UCI component 198 of FIG. 1.

At least one of the TX processor 316, the RX processor 370, and the controller/processor 375 may be configured to perform aspects in connection with the UCI reception component 199 of FIG. 1.

Figure 4:
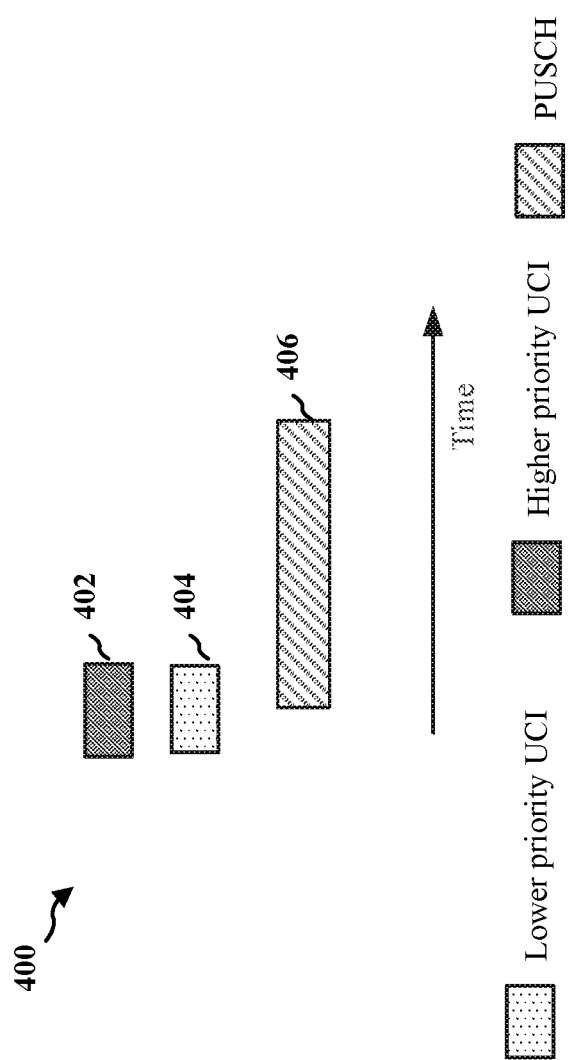
FIG. 4 is a time diagram illustrating an overlap between multiple UCI, in accordance with various aspects of the present disclosure.

A UE may exchange wireless traffic with a network, the traffic having different reliability or latency requirements. As non-limiting examples, lower priority traffic may include eMBB traffic, and higher priority traffic may include URLLC traffic. In some aspects, the UE may uplink control information that overlaps in time for the two different types of traffic. FIG. 4 illustrates an example time diagram 400 that shows a higher priority UCI transmission, e.g., 402, that is scheduled at a time that overlaps with a lower priority UCI transmission, e.g., 404.

A UE may drop a lower priority uplink transmission that collides, e.g., would overlap in time, with a higher priority uplink transmission. In this example, the UE may drop a lower priority uplink transmission on PUCCH that is scheduled for transmission at a time that overlaps a higher priority transmission in a same PUCCH group. In this example, the UE may drop the lower priority UCI 404 due to the collision in time with the higher priority UCI 402.

In some aspects, UCI may overlap in time with a physical uplink control channel (PUCCH) transmission or physical uplink shared channel (PUSCH) transmission, and the UE may multiplex the UCI with the PUCCH or the PUSCH transmission. FIG. 4 illustrates that the UCI 402 and 404 may overlap in time with the PUSCH transmission 406, which may lead the UE to multiplex the UCI with the PUSCH transmission.

Aspects presented herein enable the UE to handle the collision without dropping the lower priority UCI. In order to provide a higher level of error protection to the higher priority UCI 402 than to the lower priority UCI 404, the UE may perform separate encodings for the higher priority UCI and the lower priority UCI, e.g., using different coding rates. The different coding rates provide different error protection to the encoded UCI payload. The higher priority UCI may be encoded based on a coding rate that provides a higher level of error protection, and the lower priority UCI may be encoded based on a coding rate that provides a lower level of error protection.

The UCI may be encoded based on a payload size (K) of the UCI. For a UCI payload of K=1 bit, the UCI may be encoded based on a repetition code that maps a bit a into repetitions [a, a, . . . ]. For a UCI payload of K=2, the UCI may be encoded first based on a simplex code, which maps the two bits [a, b] to [a, b, a⊖b], and then a repetition of the three bits [a, b, a⊖b] may be performed to achieve a desired coding rate. For a UCI payload of 3≤K≤11, the UCI may be encoded based on a modified [11,32] Reed Muller code, in which 11 represents the maximum number of information bits for the UCI payload and 32 represents the coded payload (e.g., the number of coded bits after encoding). If the UCI payload is K>11, the UCI may be encoded based on a polar code. The types of channel coding for UCI may be applied in NR, for example, in which repetition code is applied for UCI with K=1, simplex code then repetition is applied for UCI with K=2, a modified [11, 32] Reed Muller code is used for 3≤K≤11, and polar code is used for K>11. Each of the examples, e.g., repetition coding, simplex code (with repetition), Reed Muller code, and polar code, provide a similar level of error protection for each bit in the UCI payload. Aspects presented herein enable the higher priority UCI and the lower priority UCI, e.g., that overlap in time, to be multiplexed in a manner that provides different levels of error protection for the UCI while maintaining consistency with channel coding schemes. For example, the aspects presented herein enable the UE to provide a higher level of error protection to the higher priority UCI while using a channel coding based on the number of bits in UCI by embedding information about a higher priority UCI payload on a codeword for a lower priority UCI payload.

The aspects presented herein enable the UE to transmit low priority UCI and high priority UCI on the same PUCCH or PUSCH while providing different error protection for the different UCI.

FIG. 5A illustrates a diagram 500 for signal generation for a PUSCH or a PUCCH at a UE including a codeword representing first UCI and embedded information about a second UCI. Lower priority UCI 502, e.g., having a payload size of $K_{LP}$ bits may be encoded, at encoder 504, to generate a codeword representing the payload of the lower priority UCI 502. The encoder may apply coding based on a number of UCI bits, e.g., as described above. After encoding the lower priority UCI, the UE embeds information about the higher priority UCI payload 510 on the encoded lower priority codeword, at 508. For example, the UE may embed the payload of the higher priority UCI on the encoded lower priority codeword. After modifying the codeword for the lower priority UCI, the UE transmits the PUSCH or PUCCH based on the modified codeword. The modified codeword represents the payload of the lower priority UCI 502 and further indicates information about the higher priority UCI 510. As illustrated at 506, the UE may perform modulation after encoding the lower priority UCI and before embedding the higher priority UCI. The UE may also perform modulation for the higher priority UCI information at 516, and the embedding at 508 may be a symbol level embedding. Also, as illustrated at 512, the UE may perform DFT-s-OFDM or CP-OFDM before transmitting the PUSCH or PUCCH.

FIG. 5B illustrates a diagram 550 for corresponding reception of the PUSCH or the PUCCH generated in FIG. 5A. The reception may be performed at a base station, for example. The receiver receives the PUSCH or PUCCH, and de-embeds the information about the higher priority UCI from the encoded lower priority UCI, at 528. The base station then decodes the UCI, at 524 in order to determine the lower priority UCI payload 522. The bae station may perform demodulation, at 526, after de-embedding the higher priority UCI information, at 528. The base station determines the higher priority UCI 530 based on the information embedded in the codeword for the lower priority UCI. The base station may perform a corresponding demodulation of the DFT-s-OFDM or CP-OFDM, at 532.

Although the example in FIGS. 5A and 5B has been described in connection with first and second UCI, the aspects may also be applied to other payloads. For example, the embedding on a codeword may be applied for two payloads for transmission at a transmitter and having different priority levels. A first payload having a first priority level may be encoded, and information about a second payload having a second priority level may be embedded on the codeword for the first payload. The embedded information may provide a different level of error protection for one of payloads. As one, non-limiting example, the aspects may be applied to multiplex downlink control information DCI while providing different error protection for the multiple DCI.

Figure 6A:
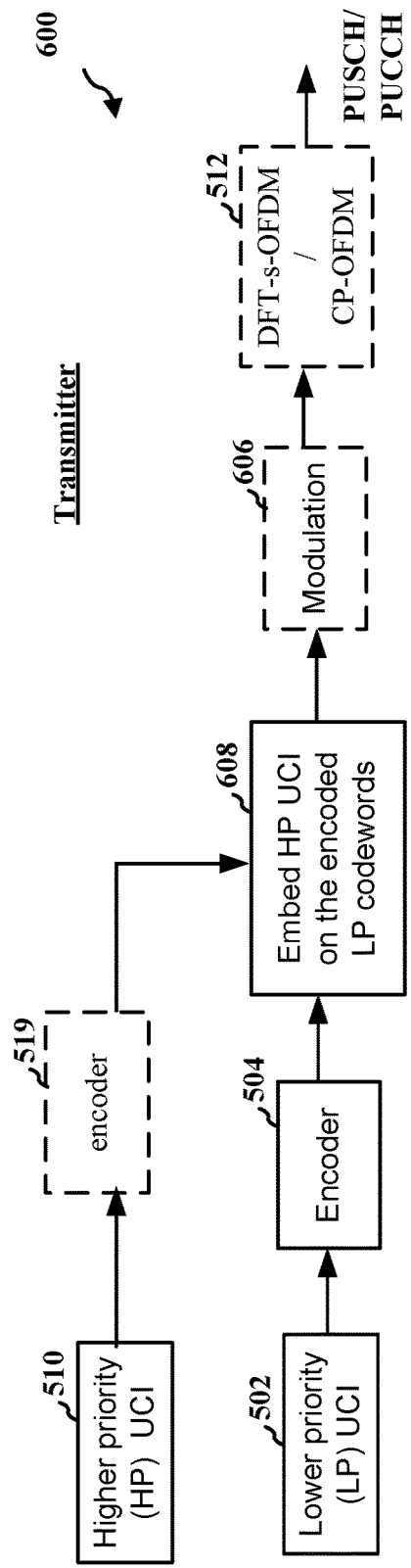
FIG. 6A illustrates a diagram for embedding information about a first UCI on a codeword for a second UCI, in accordance with various aspects of the present disclosure.
Figure 6B:
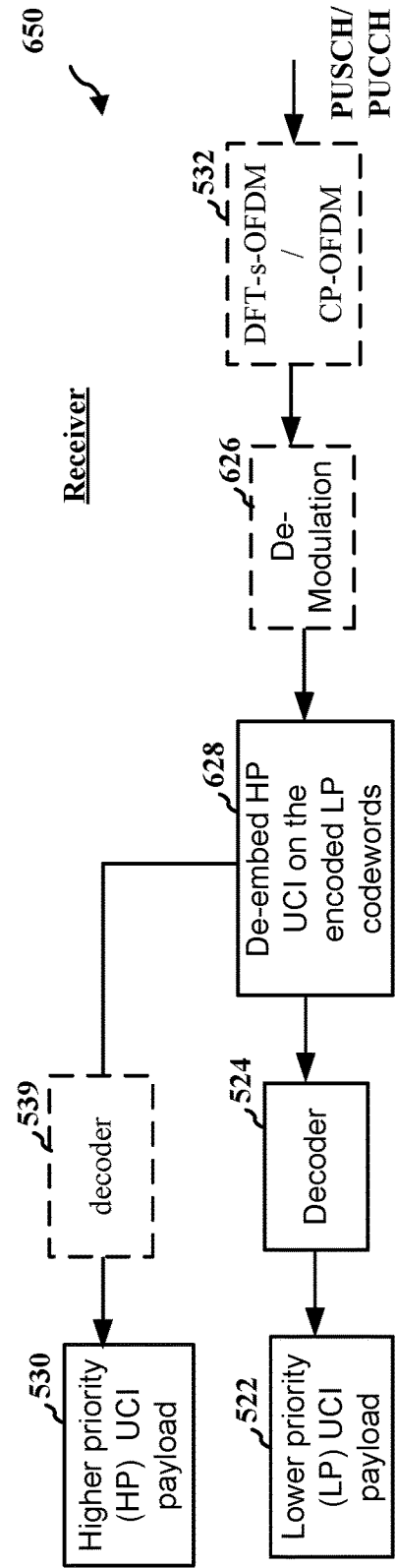
FIG. 6B illustrates a diagram for reception of UCI having embedded information for another UCI payload, in accordance with various aspects of the present disclosure.

FIG. 6A illustrates an example 600, similar to the example in FIG. 5A, in which the modulation 606 may be performed after the higher priority UCI information is embedded on the codeword for the lower priority UCI, at 608. The aspects that have been described in connection with FIG. 5A have been illustrated with the same reference number. The embedding, at 608, may be a bit level embedding in which the bits of the higher priority UCI are embedded with the lower priority UCI bits, and the symbol is then generated based on the modified bits. FIG. 6B illustrates a diagram 650 for corresponding reception of the PUSCH or the PUCCH generated in FIG. 6A. In FIG. 6B, the demodulation 626 is performed prior to de-embedding the information about the higher priority UCI from the encoded lower priority UCI, at 628. The de-embedding, at 628, may be performed on a bit level, similar to the embedding, at 608.

Figure 7A:
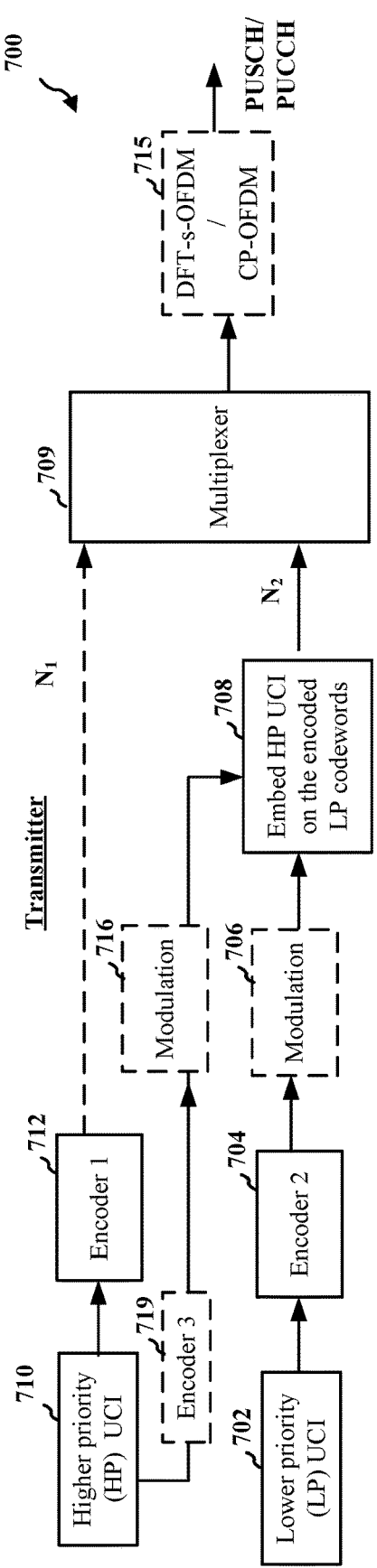
FIG. 7A illustrates a diagram for embedding information about a first UCI on a codeword for a second UCI, in accordance with various aspects of the present disclosure.

FIG. 7A illustrates an example in diagram 700 that enables the UE to separately encode the higher priority UCI payload 710 using a first encoder 712 and the lower priority UCI payload 702 using a second encoder 704 for transmission on the same PUCCH or PUSCH. The lower priority UCI may have a payload of $K_{LP}$ bits, and the higher priority UCI may have a payload of $K_{HP}$ bits. The UE may encode the higher priority UCI, at 712 to generate a first codeword. $N_1$ indicates the number of resources allocated to the higher priority UCI in the PUCCH/PUSCH. The term "codeword" is used to denote the signal that represents a set of information bits, and that can be decoded at the receiver even if the codeword is impaired by noise or fading introduced by the communication channel. A channel code is a set of codewords that are used to improve communication reliability. The technique of using "channel code" that converts a set of information bits to a set of codewords that are more resilient to the noise is also known as "encoding" or "channel encoding". The UE may encode the lower priority UCI, at 704, to generate a second codeword. After generating the second codeword for the lower priority UCI, at 708, the UE embeds information about the HP UCI on the codeword for the lower priority UCI to form a modified codeword. $N_2$ represents the number of resources of the PUCCH/PUSCH allocated to the lower priority UCI. Then, at 709, the UE multiplexes the first codeword for the higher priority UCI and the modified codeword for the lower priority UCI (e.g., the second codeword modified with the embedded information about the higher priority UCI) and transmits the multiplexed UCI on a PUSCH or a PUCCH. As illustrated in FIG. 7A, the UE may modulate the codeword, at 706, to a symbol prior to embedding the HP UCI information, at 708. The UE may similarly modulate the information about the higher priority UCI, at 716, to a symbol. The embedding, at 708, may be a symbol level embedding. Also, as illustrated at 715, the UE may perform DFT-s-OFDM or CP-OFDM before transmitting the PUSCH or PUCCH.

The base station may indicate information about N1 and N2 to the UE. The information may be indicated via any of the coding rate of the HP UCI and the LP UCI, and/or the payload size of the LP and HP UCI. In some aspects, the base station may indicate to the UE that N1=0, in which case the UE may use the scheme illustrated in FIG. 5A or FIG. 6A to transmit the multiplexed UCI, e.g., with the higher priority UCI payload embedded on the lower priority UCI codeword. If N1>0, the UE may use the scheme described in connection with FIG. 7A, as well as FIG. 8A or 9A.

Figure 7B:
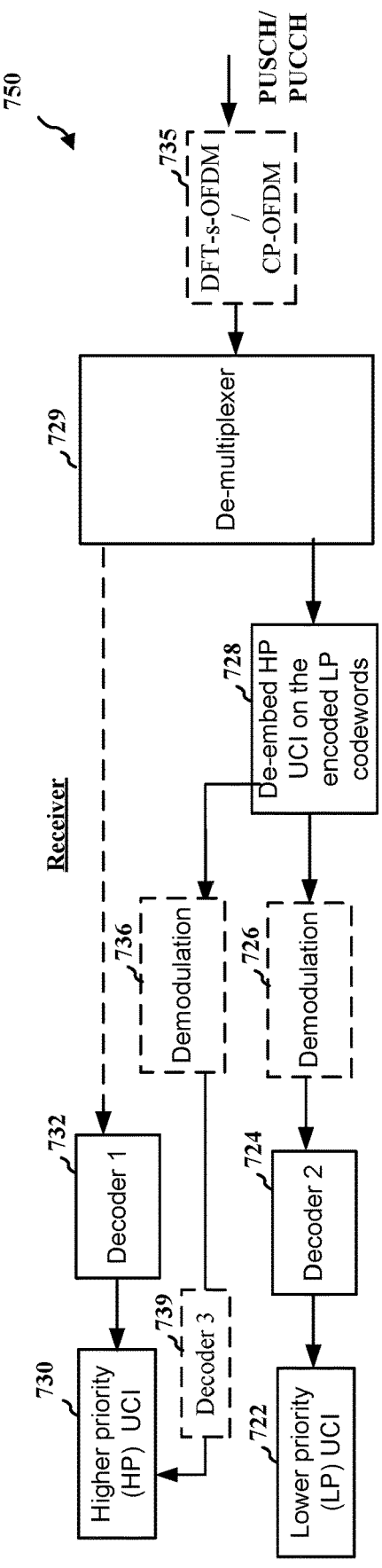
FIG. 7B illustrates a diagram for reception of UCI having embedded information for another UCI payload, in accordance with various aspects of the present disclosure.

FIG. 7B illustrates a diagram 750 showing the corresponding aspects for a receiver that receives the PUSCH/PUCCH from FIG. 7A. At 729, the receiver de-multiplexes the first codeword for the higher priority UCI and the second codeword for the lower priority UCI. The base station may perform a corresponding demodulation of the DFT-s-OFDM or CP-OFDM, at 735. The receiver may then de-embed the information about the higher priority UCI, e.g., the higher priority UCI payload, from the modified codeword for the lower priority UCI, at 728. The UE may then use the de-embedded information to assist in decoding the higher priority UCI, e.g., in connection with decoding the first codeword, at 732, in order to determine the higher priority UCI payload 730. The UE also decodes the codeword for the lower priority UCI, at 724 in order to determine the lower priority UCI payload 722. The additional information about the higher priority UCI that is carried in the modified codeword for the lower priority UCI improves the reliability of reception of the higher priority UCI. The encoders 712 and 704, and similarly the decoders 732 and 724, may apply different coding/decoding for the two UCI. Similar to the modulation prior to embedding in FIG. 7A, the receiver may demodulate the information about the higher priority UCI, at 736, after de-embedding the information. The UE may de-modulate the symbol for the first UCI, at 726.

In some aspects, the UE may determine whether or not to transmit the codeword for the higher priority UCI. Based on one or more conditions, the UE may multiplex the higher priority UCI codeword with the modified codeword for the lower priority UCI, may transmit the higher priority UCI codeword and drop transmission of the lower priority UCI, or may transmit the lower priority UCI carrying the embedded information about the higher priority UCI without transmitting the first codeword for the higher priority UCI.

Figure 8A:
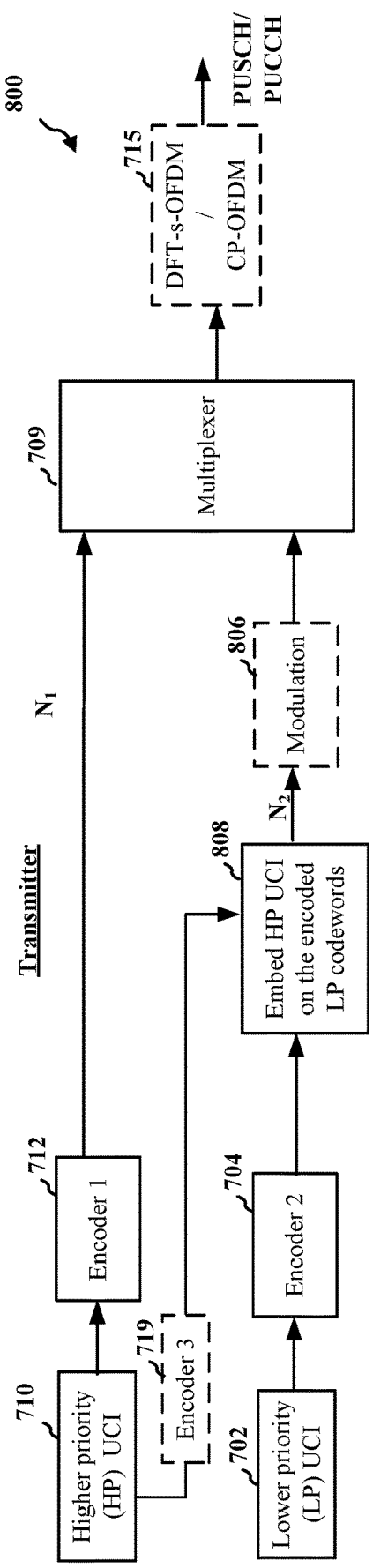
FIG. 8A illustrates a diagram for embedding information about a first UCI on a codeword for a second UCI, in accordance with various aspects of the present disclosure.
Figure 8B:
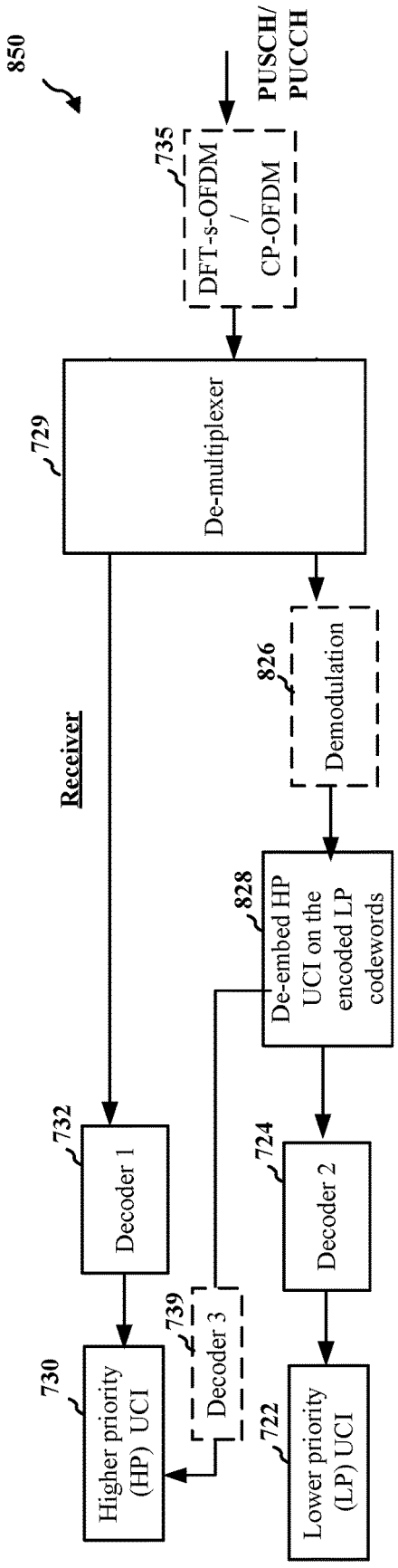
FIG. 8B illustrates a diagram for reception of UCI having embedded information for another UCI payload, in accordance with various aspects of the present disclosure.

FIG. 8A illustrates an example 800, similar to the example in FIG. 7A, in which the modulation 806 may be performed after the higher priority UCI information is embedded on the codeword for the lower priority UCI, at 808. The aspects that have been described in connection with FIG. 7A have been illustrated with the same reference number. The embedding, at 808, may be a bit level embedding in which the bits of the higher priority UCI are embedded with the lower priority UCI bits, and the symbol is then generated based on the modified bits. FIG. 8B illustrates a diagram 850 for corresponding reception of the PUSCH or the PUCCH generated in FIG. 8A. In FIG. 8B, the demodulation 826 is performed prior to de-embedding the information about the higher priority UCI from the encoded lower priority UCI, at 828. The de-embedding, at 828, may be performed on a bit level, similar to the embedding, at 808.

Figure 9A:
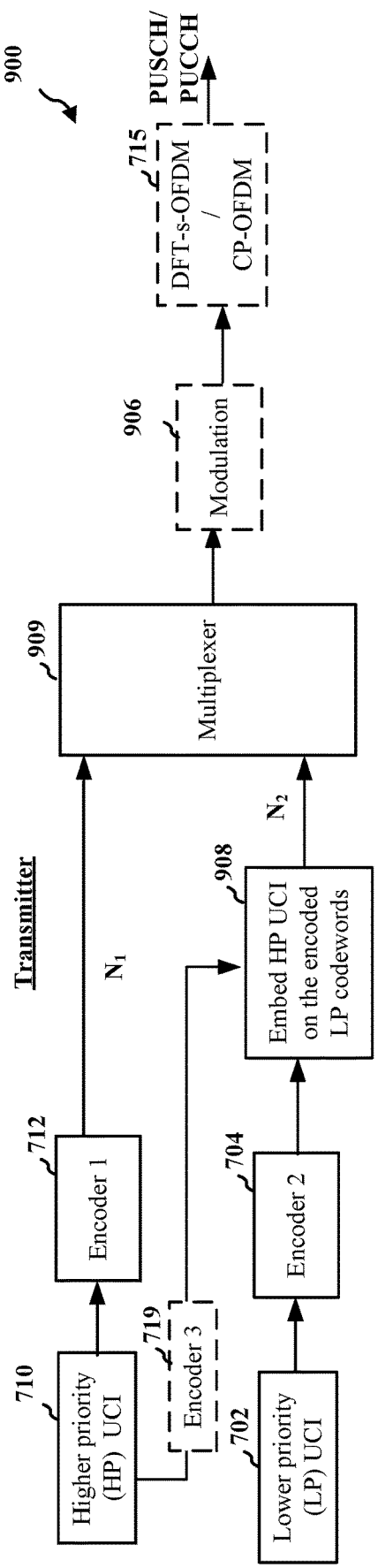
FIG. 9A illustrates a diagram for embedding information about a first UCI on a codeword for a second UCI, in accordance with various aspects of the present disclosure.
Figure 9B:
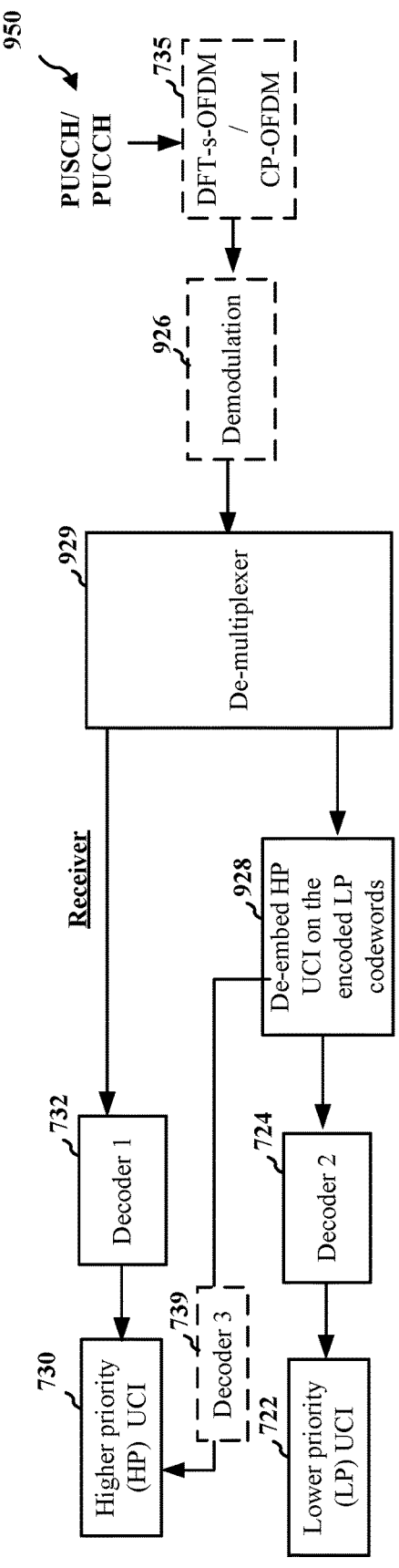
FIG. 9B illustrates a diagram for reception of UCI having embedded information for another UCI payload, in accordance with various aspects of the present disclosure.

FIG. 9A illustrates an example 900, similar to the example in FIG. 7A, in which the modulation 906 may be performed after multiplexing the first codeword for the higher priority UCI information and the modified codeword for the lower priority UCI, at 909. The aspects that have been described in connection with FIG. 7A have been illustrated with the same reference number. The embedding, at 908, may be a bit level embedding in which the bits of the higher priority UCI are embedded with the lower priority UCI bits. The modified bits may be multiplexed with the bits of the higher priority UCI, at 909, and the symbol may be generated, at 906. FIG. 9B illustrates a diagram 950 for corresponding reception of the PUSCH or the PUCCH generated in FIG. 9A. In FIG. 9B, the demodulation 926 is performed prior to de-multiplexing the information about the higher priority UCI from the encoded lower priority UCI, at 929. The de-embedding, at 928, may be performed on a bit level, similar to the embedding, at 908.

The embedding of the information about the higher UCI on a codeword for the lower priority UCI, as described in connection with any of FIGS. 5A-9B may provide better performance than merely separately encoding the two UCI. The additional information about the higher priority UCI may improve the performance of the higher priority UCI may providing additional information that improves decoding of the second UCI. By embedding the higher priority UCI information in the lower priority UCI codeword, the minimum distance of each pair of the higher priority UCI codeword is increased. The longer UCI payload size provides more coding gain. At the receiver, the higher priority UCI information is de-embedded from the lower priority UCI, and the decoding of the lower priority UCI is not affected. The performance of the lower priority UCI may be unchanged based on the aspects described in connection with FIGS. 5A-9B. The aspects presented herein may improve performance of the higher priority UCI without decreasing performance for the lower priority UCI.

In some aspects, the embedding, at 508, 608, 708, 808, or 908, may be based on super-position. The UE may super-impose an additional codeword based on the higher priority UCI onto the lower priority codeword. As an example, in FIGS. 5A and 6A, the UE may encode, at 519, the higher priority UCI to generate a codeword having a same length as the lower priority codeword generated by the encoder 504 or 704. Similarly, the receiver in FIG. 5B or 6B may include a decoder 539 to decode the de-embedded codeword for the higher priority UCI. FIG. 7A illustrates an example in which the high priority UCI may be encoded by encoder 712 to generate a first codeword and may be encoded by the encoder 719 to generate an additional codeword that has a same length as the lower priority codeword. Then, the additional codeword generated by the encoder 519 or 719 may be super-imposed on the lower priority codeword, at 708. FIGS. 8A and 9A similarly illustrate that the encoder 719 may be used to embed an additional codeword representing the higher priority UCI on to the codeword representing the lower priority UCI. The super-position can be performed either at the bit level (i.e., XOR) prior to modulation, as shown in FIGS. 8A and 9A, or at the modulated symbol level, as shown in FIG. 7A (e.g., taking the point-wise product of $\{x_i\}$ and $\{y_i\}$, where $\{x_i\}$ and $\{y_i\}$ denote the modulated HP and LP codeword, respectively).

In some aspects, the information about the higher priority UCI may be embedded on the codeword for the lower priority UCI, at 508, 608, 708, 808, or 908 based on spreading. The UE may repeat the lower priority codeword M times. The UE may generate a higher priority codeword of length M that represents the higher priority UCI, and multiplies each element of the length-M higher priority codeword with each of the M repetitions of the lower priority codeword. In other words, the UE may take the tensor product of the lower priority codeword (of length N) and the higher priority codeword (of length M) to obtain a modified codeword of length M*N. The length M higher priority codeword may be generated by the encoder 719, for example. In some aspects, the length M can be any integer between, and including, $K_{HP}$ and $2^{K_{HP}}$ (e.g., both ends of the range being inclusive), where $K_{HP}$ denotes the number of HP UCI bits. The spreading type of embedding increases the length of the modified lower priority codeword and may provide improved gain.

Similarly, FIGS. 7B, 8B, and 9B illustrate that the decoder 739 may be used to decode the additional codeword for the higher priority UCI after it is de-embedded from the lower priority codeword.

For a 1 bit higher priority UCI (e.g., $K_{HP}=1$) and a lower priority UCI having 1 or more bits (e.g., $K_{LP} \geq 1$), the 1 bit higher priority UCI may be encoded into a codeword $x_{HP}$ by the encoder 519 or 719 and the K bit LP UCI is encoded into a second codeword $y_{LP}$.

In some aspects, the UE may embed the higher priority UCI on the low priority UCI codeword by multiplexing the high priority UCI codeword (e.g., from the encoder 3 719) with the low priority UCI codeword in a non-orthogonal manner.

In some aspects, to embed the higher priority UCI on the codeword for the lower priority UCI based on super-positioning, the UE may modify $y_{LP}$ based on the higher priority UCI according to:

$$\tilde{y}_{LP} = \begin{cases} y_{LP} \odot c_0, & \text{if } HPUCI = 0 \\ y_{LP} \odot c_1, & \text{if } HPUCI = 1 \end{cases}$$

In this super-positioning example, $c_0$ and $c_1$ represent two different codewords that have the same length as $y_{LP}$, and $\odot$ denotes either the point-wise XOR (if the embedding is performed at bit level) or a pointwise multiplication (if the embedding is performed at symbol level).

In some aspects, to embed the higher priority UCI on the codeword for the lower priority UCI based on spreading, the UE may modify $y_{LP}$ based on the higher priority UCI according to:

$$\tilde{y}_{LP} = \begin{cases} [y_{LP}, y_{LP}], & \text{if } HPUCI = 0 \\ [y_{LP}, -y_{LP}], & \text{if } HPUCI = 1 \end{cases}$$

In some aspects, to embed the higher priority UCI on the codeword for the lower priority UCI, the UE may first encode the HP UCI (e.g., of $K_{HP}$ bits) into a codeword of length M, denoted by $c_1, c_2, \ldots, c_M$. Then, the UEs may multiplex each element of the length-M codeword to a repetition of the LP codeword to generate a length-N*M codeword:

$$\tilde{y}_{LP} = [c_1, c_2, \ldots, c_M] \otimes y_{LP}$$

or $$\tilde{y}_{LP} = y_{LP} \otimes [c_1, c_2, \ldots, c_M].$$

In these formulas, $\otimes$ represents the Kronecker product. After the embedding is performed, whether based on super-positioning or spreading, the modified codeword $\tilde{y}_{LP}$ is multiplexed with the higher priority codeword $x_{HP}$, at the multiplexer 709 or 909 in FIG. 7A, 8A, or 9A.

The UE may determine the coded length of the lower priority UCI before spreading based on the number of resources for transmitting the lower priority UCI and based on the spreading factor ($2^{K}HP$).

The receiver may either first decode the higher priority UCI, and then decode the lower priority UCI (by cancelling the interference from the higher priority UCI in $\tilde{y}_{LP}$), or may perform an ML (maximum likelihood) detection on the concatenated higher priority and lower priority payload.

The aspects presented herein may have more of an effect on UCI when the higher priority UCI and/or the lower priority UCI have a payload size within a range. The range may indicate a UCI payload having a smaller number of bits. The UE may determine whether or not to embed the information about the higher priority UCI on the codeword for the lower priority UCI based on a condition. The condition may be based on a UCI bit size of the higher priority UCI and/or the lower priority UCI. The condition may be based on a type of channel on which the UCI is to be transmitted, e.g., whether the UCI will be transmitted on a PUCCH or a PUSCH.

As a first example, if the higher priority UCI has a bit size of two or less, e.g., if $K_{HP} \leq 2$, the UE may embed the information about the higher priority UCI on the codeword for the lower priority UCI, according to the aspects of any of FIGS. 5A-9A. As another example, if $K_{HP}+K_{LP} \leq a$ threshold number of bits, the UE may embed the information about the higher priority UCI on the codeword for the lower priority UCI, according to the aspects of any of FIGS. 5A-9A. In some aspects, the threshold number of bits may be 11 or 13, for example. These examples are merely to illustrate the concept, and the aspects may be similarly applied for other threshold numbers of bits. As another example, if $K_{HP} \leq K1$ bits and $K_{LP} \leq K2$ bits, the UE may embed the information about the higher priority UCI on the codeword for the lower priority UCI, according to the aspects of any of FIGS. 5A-9A. K1 corresponds to a first threshold number of bits, and K2 corresponds to a second threshold number of bits. In some aspects, K1 may equal K2. As one non-limiting example, K1=K2=2 bits. In other aspects, K1 may be different than K2. As one non-limiting example, K1=2 bits and K2=11 bits. If the condition is not met, the UE may separately encode the higher priority UCI and the lower priority UCI (without embedding information about the higher priority UCI on the lower priority UCI). The embedding may cause the receiver to employ a more complicated receiving algorithm than the separate encoding without embedding. Therefore, the UE may employ the embedding when the payload size of the higher priority UCI and/or the lower priority UCI is smaller and more likely to experience a performance improvement based on the embedding.

In other aspects, the UE may apply the embedding described in connection with FIG. 5A-9A, if the lower priority UCI and the higher priority UCI are being transmitted on a PUSCH, and may separately encode the higher priority UCI and the lower priority UCI (without embedding the higher priority UCI information) if the multiplexed payload will be transmitted on a PUCCH. In other aspects, the UE may perform the embedding if the UCI will be transmitted on a PUCCH, and may separately encode the UCI without embedding if the UCI will be transmitted on a PUSCH.

The UE may further multiplex a second codeword representing the higher priority UCI payload with the modified first codeword. The aspects presented herein may enable the UE to transmit information about both the higher priority UCI and the lower priority UCI without dropping the lower priority UCI. By embedding the information about the higher priority UCI on the codeword for the lower priority UCI, the UE may provide a higher level of protection to the higher priority UCI. A base station receiving the uplink transmission from the UE may determine the embedded information about the higher priority and may use the information to decode the second UCI payload.

In some aspects, uplink transmissions may have different priorities based on the reliability and/or latency specification of the traffic. That is, the uplink transmissions may have a high priority based on the serving traffic having high reliability and/or low latency specification, and the uplink transmission may have a low priority based on the serving traffic having low reliability and/or high latency specification.

In some aspects, at least one of uplink transmission (e.g., PUCCH/PUSCH), including the repetitions thereof, may be of priority index 0 or priority index 1. The priority index 0 may be referred to as a low priority level, and the priority index 1 may be referred to as a high priority level. The base station may configure the UE with the priority index for the uplink transmissions, and the UE may determine the priority index for the uplink transmissions based on the configuration. If the priority index is not provided to the UE for uplink transmissions, e.g., PUSCH/PUCCH transmissions, the priority index may be 0. For example, the uplink transmission serving an enhanced mobile broadband (eMMB) may have a low priority (LP), and the uplink transmission serving an ultra-reliable low latency communication (URLLC) may have a high priority (HP).

In one aspect, when HP UCI and LP UCI are scheduled on the same time slot, the UE may drop the LP UCI and transmit the HP UCI. That is, a LP uplink transmission (e.g., PUCCH/PUSCH) may be dropped and not transmitted due to a collision, e.g., overlap in time, with an HP uplink transmission in the same PUCCH group.

In some aspects, when the HP UCI and the LP UCI are scheduled on the same time slot, the UE may transmit both the UL UCI and the HP UCI. In such a case, the UE may provide better protection for the HP UCI compared to the LP UCI while avoiding dropping the transmission of the LP UCI.

As one example, the UE may perform separate encodings for the HP UCI and the LP UCI using different coding rates for the HP UCI and the LP UCI to have unequal error protection. Aspects presented herein provide for the UE to transmit the HP UCI and the LP UCI with different error protection in a way that improves performance.

In some aspects, the UE may multiplex the HP UCI and the LP UCI with unequal error protection and joint encoding. In some aspects, the UE may apply HP/LP UCI multiplexing on a PUCCH with a DFT-s-OFDM waveform. The HP/LP UCI multiplexing on the PUCCH may include some modifications that improve the efficiency/efficacy of the DFT-s-OFDM waveform. Although the following description may be focused on multiplexing the HP UCI and LP UCI on the PUCCH, the concepts described herein may be applicable to other similar situations, such as multiplexing the UCI and LP UCI on PUSCH. As well, although aspects are described for HP and LP UCI, the aspects may be applied for other payloads having different reliability requirements. A transmitter may apply the concepts presented herein for a first payload having a first priority level and a second payload having a second priority level. As one non-limiting example, a base station may apply the aspects presented herein to jointly transmit HP DCI and LP DCI.

Figure 10:
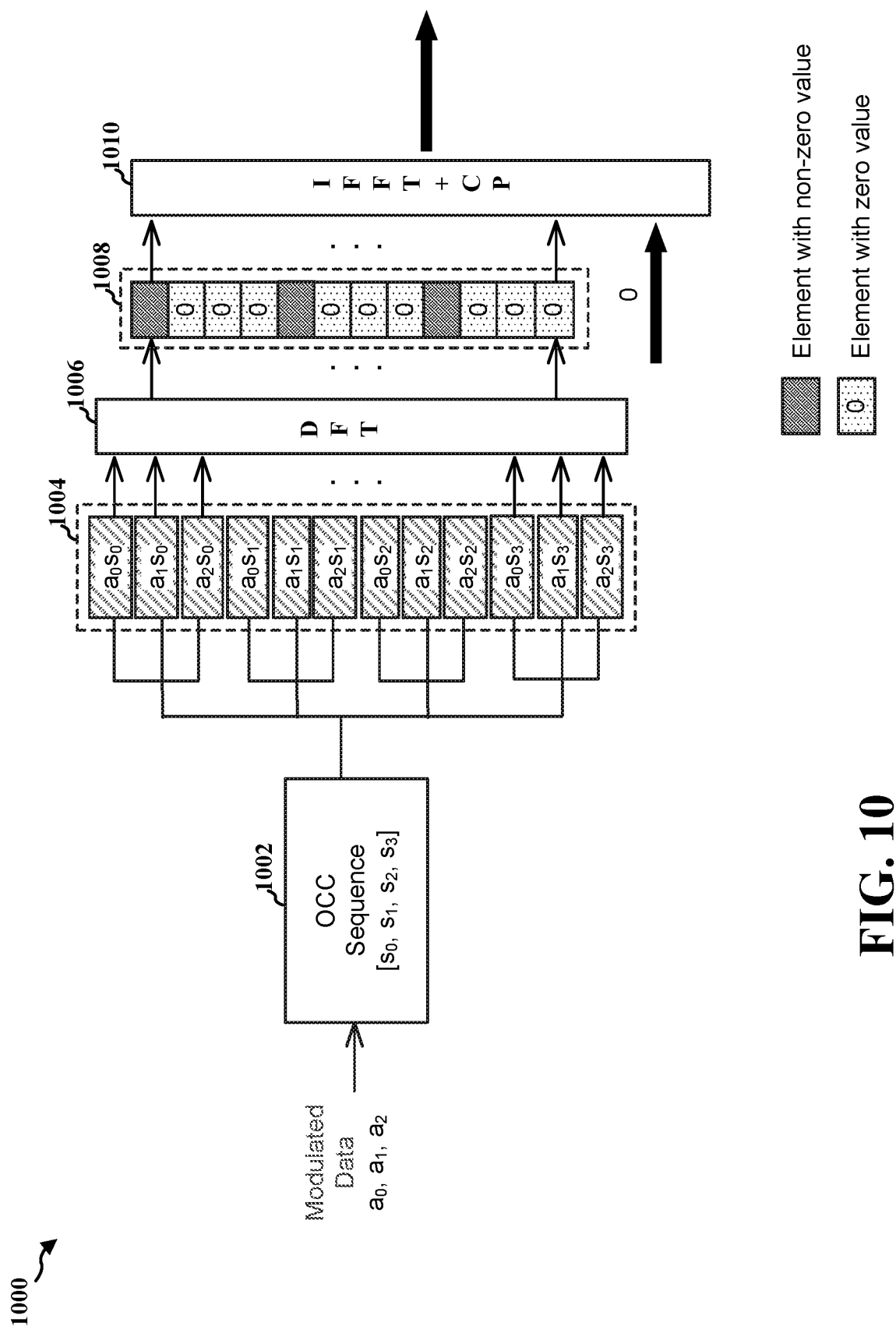
FIG. 10 is an example of time domain spreading for a method of wireless communication, in accordance with various aspects of the present disclosure.

FIG. 10 is an example 1000 of time-domain spreading for a method of wireless communication. The example 1000 illustrate the time domain spreading and orthogonal cover code (OCC) 1002 for DFT-s-OFDM symbols. The time-domain spreading and the OCC 1002 create a comb structure in the frequency domain after DFT 1006. First, a set of modulated data $[a_0, a_1, a_2]$ may be repeated or spread K times, and the spread set of modulated data may be multiplied with the OCC 1002. The spread set of modulated data multiplied with the OCC 1002 may be DFTed 1006. The resulting data in the frequency domain forms a comb structure 1008 with non-zero elements in every K frequency tones/subcarriers, with the rest of the frequency elements having the value of zero.

The UE may receive modulated data generated by encoding and modulating a message into a codeword. Here, the codeword refers to a signal that represents a set of information bits that a receiver may decode with noise or deterioration introduces to the signal. A channel code is a set of codewords that are used to improve communication reliability. The technique of using "channel code" that converts a set of information bits to a set of codewords that are more resilient to the noise is also known as "encoding" or "channel encoding". The UE may repeat the modulated data of the codeword and multiply each repetition of the modulated data with the OCC. The UE may pass the repetition of the modulated data multiplied with the OCC through the DFT results in a set of data of an equal length including a number of the subset of data block including one element that has non-zero value with the other elements of each subset of data block including zero value.

For example, the modulated data may include $[a_0, a_1, a_2]$, and the OCC sequence may include $[s_0, s_1, s_2, s_3]$. The modulated data may be repeated 4 times and multiplied with each sequence of the OCC to generate a second set of data 1004 including $[a_0s_0, a_1s_0, a_1s_0, a_0s_1, a_1s_1, a_2s_1, a_0s_2, a_1s_2, a_2s_2, a_0s_3, a_1s_3, a_2s_3]$. Applying the DFT 1006 to the second set of data 1004 may generate the comb structure 1008. Here, the comb structure 1008 may have non-zero elements in every 4 subcarriers, appearing at 4n−3 subcarriers, n being an integer greater than or equal to 1. Then, IFFT and CP may be applied at 1010.

The OCC may have various sizes in some aspects. In one aspect, the OCC may have a size of 2. The OCC of the size 2 may include two possible OCC sequences. The two OCC sequences may include [+1, +1], e.g., which may be associated with an index of "0", and [+1, −1], which may be associated with an index of "1" as shown in table 1. In another aspect, the OCC may have a size of 4. The OCC of the size of 4 may include four possible OCC sequences. The four OCC sequence may include [+1, +1, +1, +1] associated with an index of 0, [+1, −j, +1, +j] associated with an index of 1, [+1, −1, +1, −1] associated with an index of 2, and [+1, +j, +1, −j] associated with an index of 3 as shown in table 2.

The size of OCC may correspond with the number K that the non-zero elements appear in every K subcarriers. For example, when the data has length 3 and K=4, we may select to use the OCC of the size of 4.

TABLE 1

Size 2 OCC

| index | $s_n$, n = 0, 1 |
|---|---|
| 0 | [+1, +1] |
| 1 | [+1, −1] |

TABLE 2

Size 4 OCC

| index | $s_n$, n = 0, 1, 2, 3 |
|---|---|
| 0 (00) | [+1, +1, +1, +1] |
| 1 (01) | [+1, −j, +1, +j] |
| 2 (10) | [+1, −1, +1, −1] |
| 3 (11) | [+1, +j, +1, −j] |

In some aspects, the particular location of the non-zero elements/tones may depend on the applied sequence of the OCC. Here, the location may refer to a number of the subcarrier of the DFT-s-OFDM symbol. That is, the OCC may determine the location of the non-zero elements/tones after DFT, and the OCC with a specific index may be selected to determine the number of the subcarrier of the DFT-s-OFDM symbol of the non-zero elements/tones. For example, in the case of the OCC having the size of 4, the non-zero tones may appear every 4 subcarriers, and the specific sequence of OCC applied to the spread modulated data may result in the non-zero tones in the 1st, 2nd, 3rd, and 4th position within each set of every 4 consecutive subcarriers.

In some aspects, the PUCCH may have various formats with short/long duration, different payload size ranges, and different multiplexing capabilities. For example, the PUCCH may have one of the five PUCCH formats as provided in the following table 3. Table 3 is merely an example and other waveforms may be applied for additional PUCCH formats. For example, additional PUCCH formats may be added that have a DFT-s-OFDM waveform.

In some aspects, the HP UCI and the LP UCI may be transmitted on a third set of resources including a third number of resources (e.g., OFDM symbols) which corresponds with the remaining OFDM symbols. That is, the third set of resources may correspond with the OFDM symbols of the PUCCH other than the first set of resources or the second set of resources. In one aspect, the first set of resources may be assigned for transmitting the DMRS, and the third set of resources may correspond with the remaining resources of PUCCH after assigning the first set of resources. In another aspect, the first set of resources may be assigned for transmitting the DMRS and the second set of resources may be assigned for transmitting the HP UCI, and the third set of resources may correspond with the remaining resources of PUCCH after assigning the first set of resources and the second set of resources. In another aspect, the resources of PUCCH may include the third set of resources without the first set of resources assigned for transmitting the DMRS and the second set of resources assigned for transmitting the HP UCI. For example, the low priority UCI may be transmitted on the subset of subcarriers on all of the resources for the PUCCH, e.g., without symbols for DMRS and/or the higher priority UCI.

The third number of resources (e.g., the remaining number of OFDM symbols) may convey information for both the HP UCI and the LP UCI. In some aspects, one of the HP UCI and the LP UCI may be conveyed via the subset of subcarriers of multiple subcarriers, and the other of the HP UCI and the LP UCI may be transmitted via the signals transmitted on a subset of subcarriers of the third set of resources. As an example, the subset of subcarriers among the multiple subcarriers may be determined based on the HP UCI, and the LP UCI may be conveyed through a signal transmitted on the non-zero subcarriers. In another example, the signal may convey the HP UCI and the information about the LP UCI may be conveyed through the subset of subcarriers on which the signal is transmitted. In one aspect, the signal conveying the HP UCI and information about the LP UCI may include the PUCCH.

TABLE 3

PUCCH formats in NR

| PUCCH Format | Length in #OFDM symbols | #UCI bits | Waveform | Description |
|---|---|---|---|---|
| 0 | 1-2 | ≤2 | CGS seq. | Short PUCCH format with 1-2 bits UCI |
| 1 | 4-14 | ≤2 | CGS seq. | Long PUCCH format with 1-2 bits UCI (TD-OCC) |
| 2 | 1-2 | >2 | OFDM | Short PUCCH format with >2 bits UCI |
| 3 | 4-14 | >2 | DFT-s-OFDM | Long PUCCH format with >2-bits UCI and no multiplexing capability |
| 4 | 4-14 | >2 | DFT-s-OFDM | Long PUCCH format with >2-bits UCI and multiplexing capability |

Figure 11:
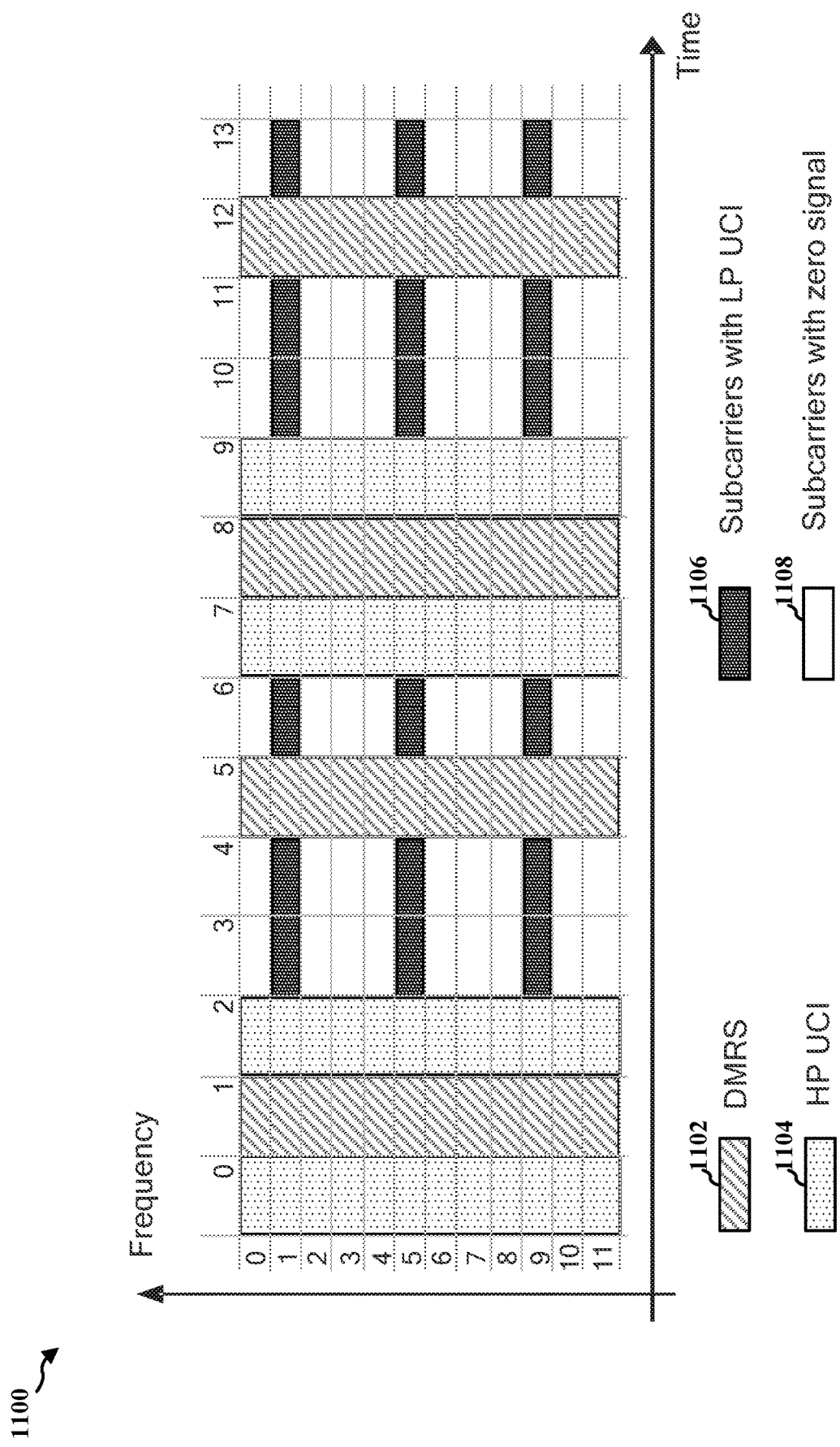
FIG. 11 is an example PUCCH structure of a method of wireless communication, in accordance with various aspects of the present disclosure.

FIG. 11 is an example PUCCH structure 1100 including HP UCI and LP UCI. The example PUCCH structure 1100 provides a method of multiplexing the HP UCI and the LP UCI. In one aspect, a first set of resources including a first number of resources (e.g., OFDM symbols) may be assigned for transmitting DMRS. In some aspects, the DMRS may be omitted. In another aspect, a second set of resources including a second number of resources (e.g., OFDM symbols) may be assigned for transmitting the HP UCI. In some aspects, the symbols of HP UCI may be omitted.

In one aspect, the HP UCI may be conveyed via the subset of non-zero subcarriers of multiple subcarriers within the third set of resources, e.g., one or more symbols, and the LP UCI may be transmitted via the signals transmitted on the subset of non-zero subcarriers. The subset of subcarriers may be one subset among multiple options of subsets of subcarriers. For example, the options of subsets of subcarriers may be based on the different options described in connection with FIG. 10. FIG. 11 illustrates an example in which the LP UCI is transmitted on REs 1, 5, and 9. Table 4 illustrates an example of multiple subsets of carriers that may correspond to different HP UCI.

TABLE 4

| HP UCI | Non-zero REs for LP UCI |
|---|---|
| 00 | 0, 4, 8 |
| 01 | 1, 5, 9 |
| 10 | 2, 6, 10 |
| 11 | 3, 7, 11 |

The subset of subcarriers among the multiple subcarriers within the third set of resources may be determined based on the HP UCI, and the LP UCI may be transmitted via the signals transmitted on the subset of subcarriers determined based on the HP UCI. Accordingly, the information about the HP UCI, i.e., the payload of the HP UCI, may be conveyed based on the subset of subcarriers selected from the multiple subsets of subcarriers within the third set of resources, and the information of the LP UCI may be conveyed via the signals transmitted on the subset of subcarriers within the third set of resources.

The number of subsets of resources in the multiple subsets of subcarriers may be determined based on the size of the HP UCI, and each subset of resources may correspond to different comb indices on the same OFDM symbols representing the information of the HP UCI. For example, the number of subsets K may be represented as $K=2^{number\ of\ HP\ UCI\ bits}$, and a comb index 0 may denote all subcarriers N that satisfies N mod K=0, and a comb index 1 may denote the subcarriers M that satisfies M mod K=1, etc. For example, table 5 illustrates an example for 2 bits of HP UCI.

Referring to the example PUCCH structure 1100, OFDM symbols 1, 5, 8, and 12 may be allocated for transmitting the DMRS 1102, OFDM symbols 0, 2, 7, and 9 may be allocated for transmitting the HP UCI 1104, and OFDM symbols 3, 4, 6, 10, 11, and 13 may be allocated for transmitting multiplexed HP UCI and LP UCI via the subcarriers with LP UCI 1106 and the subcarriers with zero signal 1108. In one aspect, in case the example PUCCH structure 1100 may not include symbols for transmitting the HP UCI 1104, the OFDM symbols 0, 2-4, 6, 7, 9-11, and 13 may be allocated for transmitting multiplexed HP UCI and LP UCI via the subcarriers with LP UCI 1106 and the subcarriers with zero signal 1108.

Here, HP UCI has 2 bits, and the information of the HP UCI may be conveyed through the comb index. In one aspect, the HP UCI may have 2 bits, and the number of subsets K may be $K=2^2=4$. The subcarriers with the non-zero value of the LP UCI 1106 appear on subcarriers 1, 5, and 9. Accordingly, the subcarriers with LP UCI 1106 on OFDM symbols 3, 4, 6, 10, 11, and 13 may indicate that the comb index of the example PUCCH structure 1100 is 1, representing that the 2 bits value of the HP UCI is 01.

In one aspect, the multiple subsets of resources may correspond to different resource block (RB) sets. That is, each subset of resources of the multiple subsets of resources may correspond to an RB set of different RB sets. Accordingly, the DMRS may be constrained within the RBs that actually carry the LP data.

The UE may transmit the PUCCH including the multiplexed HP UCI and LP UCI to the base station, and the base station may receive the PUCCH and decode the multiplexed HP UCI and LP UCI. In some aspects, the base station may receive, from the UE, the PUCCH including the third set of resources including the subset of subcarriers of multiple subsets of subcarriers indicating the HP UCI and the LP UCI and determine the HP UCI from the comb index (or the RB/subcarrier index) of the subset of subcarriers carrying the signal of the LP UCI, and the LP UCI from the signal carried on the subset of subcarriers.

Figure 12A:
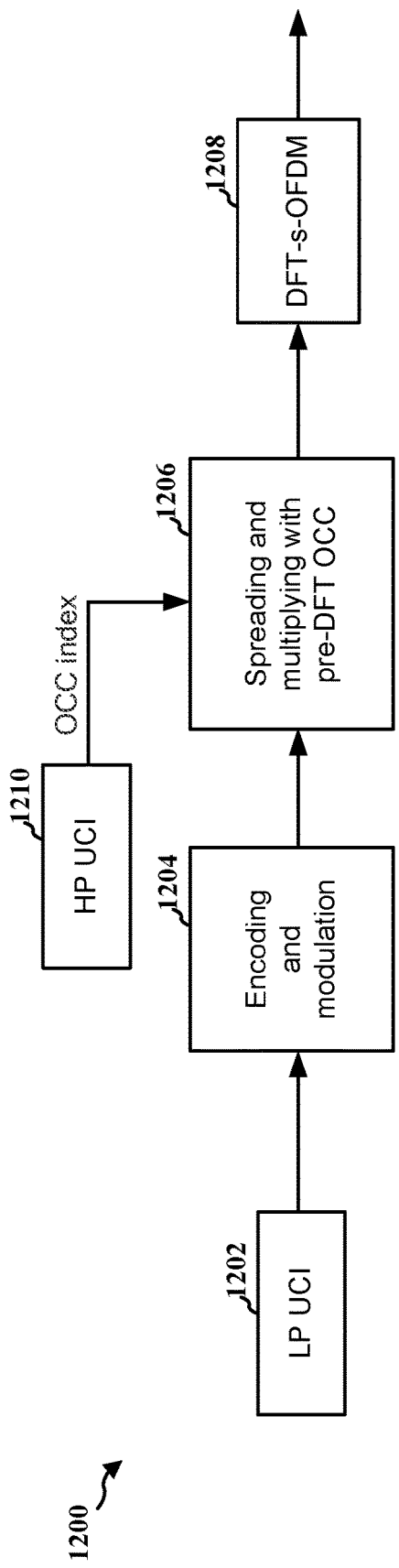
FIG. 12A and FIG. 12B are examples of multiplexing HP UCI and LP UCI of a method of wireless communication, in accordance with various aspects of the present disclosure.
Figure 12B:
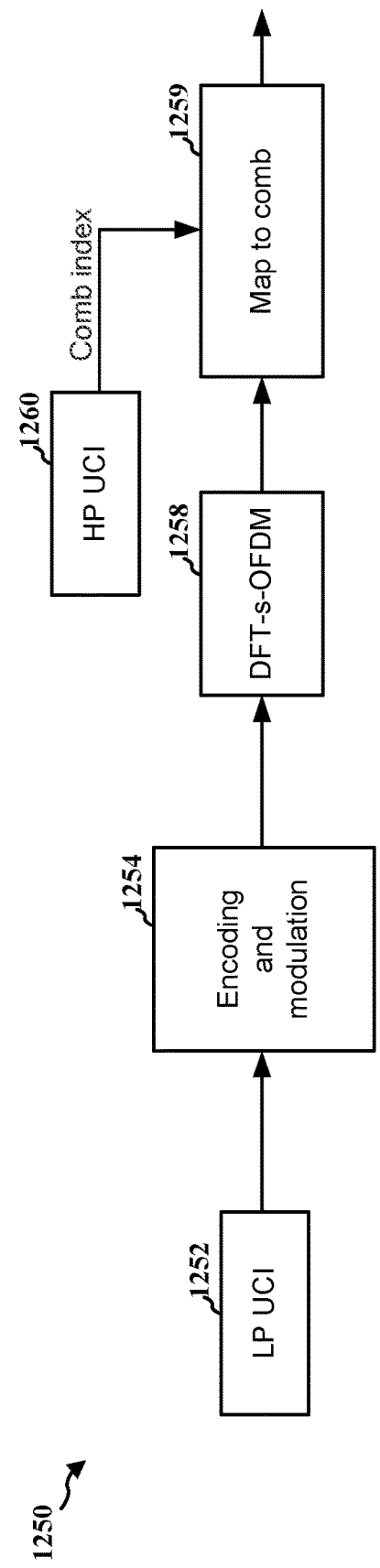

FIGS. 12A and 12B are examples 1200 and 1250 of multiplexing the HP UCI and the LP UCI of a method of wireless communication. In some aspects, the first example 1200 illustrates a method of multiplexing the HP UCI 1210 and the LP UCI 1202 by generating a frequency domain comb structure using time-domain spreading and OCC sequence. As described in connection with FIG. 10, the LP UCI 1202 may first be encoded and modulated 1204. A transceiver may, for each OFDM symbol, spread the LP signal K times and multiply with the OCC sequence that corresponds to the HP UCI. Here, the transceiver may be a UE. That is, the modulated data from the encoding and modulation 1204 may be spread and multiplied with a pre-DFT OCC 1206. The transceiver may select the OCC sequence with the OCC index of the OCC sequence corresponding with the HP UCI 1201. The non-zero signal after DFT may occupy a subset of subcarriers that correspond to a particular comb associated with the HP UCI payload. That is, the outcome of the DFT-s-OFDM 1208 may have the frequency domain comb structure including the subset of subcarriers carrying the information of the LP UCI 1202, where the comb index of the subset of subcarriers indicating the HP UCI 1210.

The second example 1250 illustrates a method of multiplexing the HP UCI 1260 and the LP UCI 1252 by generating a frequency domain comb structure by mapping the encoded LP UCI to the corresponding subset of subcarriers without spreading. That is, each subset of subcarriers may correspond to one comb index that may represent one payload of HP UCI, respectively, and the transceiver, e.g., the UE, may select one subset of subcarriers that corresponds to the comb index that represents the payload of the HP UCI 1260. The transceiver may determine the subcarrier/comb index based on the HP UCI and map the encoded LP UCI to the corresponding set of subcarriers on the OFDM symbols scheduled to transmit the LP UCI. That is, the LP UCI 1252 may first be encoded and modulated 1254, and the transceiver may apply the DFT-s-OFDM 1258 to the modulated data. The transceiver may directly determine a comb index based on the HP UCI 1260. For each OFDM symbol, the transceiver may, at 1259, map the encoded LP UCI to the set of subcarriers determined based on the HP UCI 1260 on the OFDM symbols scheduled to transmit the LP UCI. That is, the signal mapped based on the comb index may have the frequency domain comb structure including the subset of subcarriers carrying the information of the LP UCI 1252, where the comb index of the subset of subcarriers indicates the HP UCI 1260.

In some aspects, the UE may multiplex the HP UCI and the LP UCI based on the format of the PUCCH resource scheduled to multiplex the HP UCI and the LP UCI. In one aspect, the UE may determine to multiplex the HP UCI and the LP UCI based on the format of the PUCCH resource scheduled to multiplex the HP UCI and the LP UCI being the PUCCH format 3 or the PUCCH format 4. That is, the UE may determine to use the method of multiplexing the HP UCI and the LP UCI based on the format of the PUCCH resource scheduled to multiplex the HP UCI and the LP UCI being the PUCCH format 3 or the PUCCH format 4. The UE may determine to use a different scheme to transmit the HP UCI and the LP UCI based on the format of the PUCCH resource scheduled to multiplex the HP UCI and the LP UCI being one of the PUCCH format 0, 1, or 2. In one aspect, the UE may determine to drop a transmission of the LP UCI in response to the PUCCH resource scheduled to multiplex the HP UCI and the LP UCI being one of the PUCCH formats 0, 1, or 2. In another aspect, the UE may multiplex the HP UCI and the LP UCI on the PUCCH format 0, 1, or 2 based on a non-DFT-s-OFDM waveform, e.g., a CP-OFDM waveform or a computer generated sequences (CGS) is used to multiplex the HP UCI and the LP UCI.

In some aspects, the UE may multiplex the HP UCI and the LP UCI based on the PUCCH format being based on the DFT-s-OFDM waveform is used to multiplex the HP UCI and the LP UCI. That is, the UE may determine to use a different scheme to transmit the HP UCI and the LP UCI based on the PUCCH format being based on the DFT-s-OFDM waveform is not used to multiplex the HP UCI and the LP UCI. For example, the UE may determine to drop transmission of the LP UCI in response to the PUCCH resource scheduled to multiplex the HP UCI and the LP UCI being of a PUCCH format based on CP-OFDM waveform.

Figure 13:
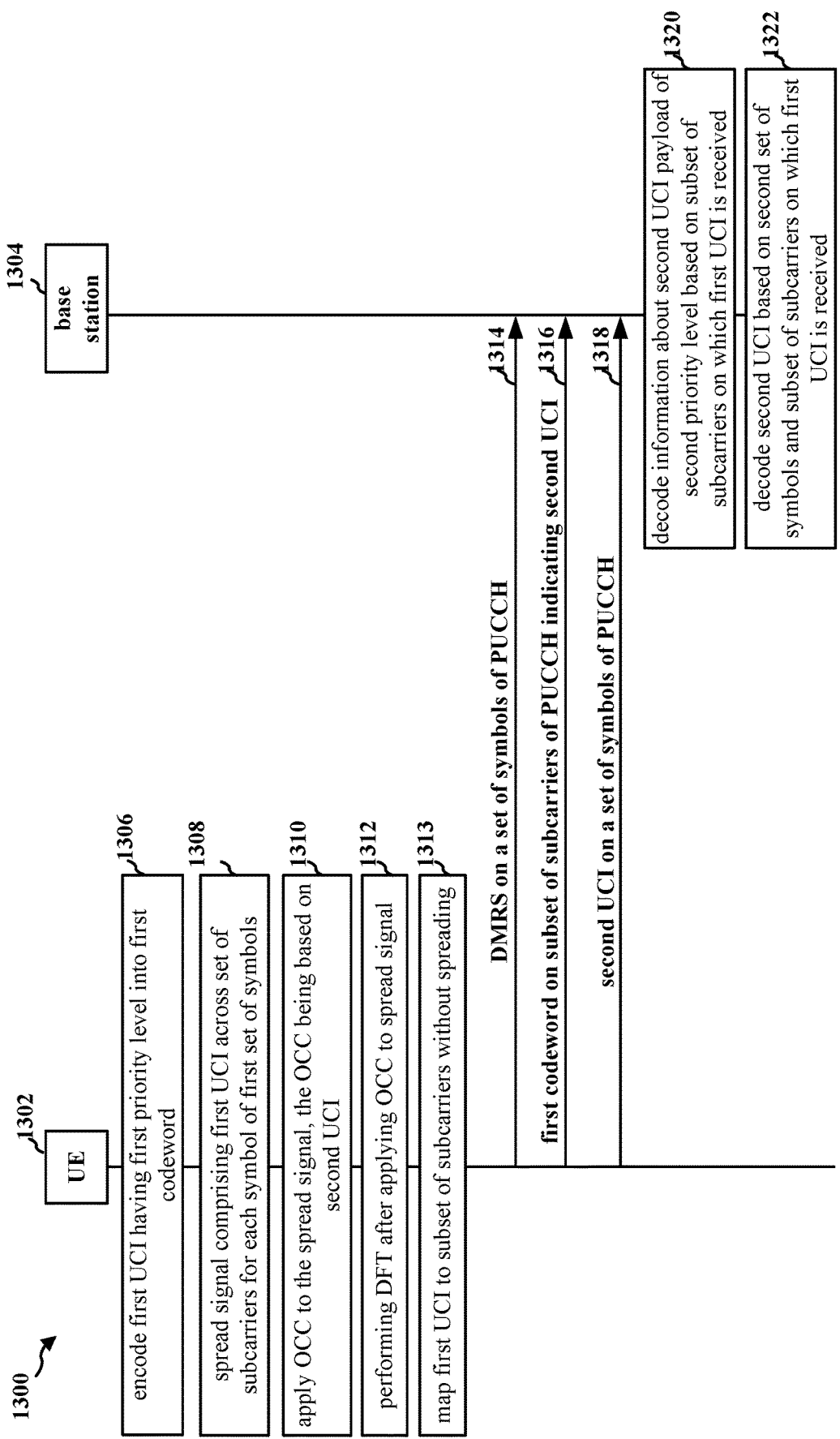
FIG. 13 is a communication diagram of a method of wireless communication, in accordance with various aspects of the present disclosure.

FIG. 13 is a communication diagram 1300 of a method of wireless communication. The communication diagram 1300 may include a UE 1302 and a base station 1304. The UE may multiplex first UCI having a first priority level and second UCI having a second priority level on a PUCCH, the second priority level different from the first priority level. For example, the UE may multiplex HP UCI having a high priority level and LP UCI having a low priority level on the PUCCH.

At 1306, the UE encodes the first UCI having the first priority level into a first codeword. In one aspect, the first UCI may include LP UCI. The UE may receive the first UCI and encode and modulate the first UCI into a first codeword.

In one aspect, the UE may multiplex the first UCI having the first priority level and the second UCI having the second priority level using the time-domain spreading and multiplying the OCC. At 1308, the UE may spread a signal comprising the first UCI across a set of resources for each symbol of the first set of one or more symbols. In one aspect, the set of resources may be a set of subcarriers. In another aspect, the set of resources may be a set of RBs. In one aspect, the first UCI may be spread a first number of times. Here, the spreading the codeword including sequences of modulated data the first number of times may include repeating the sequences of modulated data the first number of times.

In some aspects, the set of subcarriers may include multiple subsets of subcarriers. In one aspect, a number of the subsets of subcarriers in the multiple subsets of subcarriers may be determined based on a payload size of the second UCI of the second priority level. In another aspect, the first UCI may be encoded to the first codeword based on the number of the subsets of subcarriers in the multiple subsets of subcarriers determined based on the payload size of the second UCI.

At 1310, the UE may apply an OCC to the spread signal, the OCC being based on the second UCI. The OCC may be selected based on the second UCI, and the spread single applied with the selected OCC sequence may, after the DFT, generate the comb structure in a set of subcarriers, where the comb structure has a comb index representing the information of the second UCI having the second priority level.

At 1312, the UE may perform a DFT after applying the OCC to the spread signal. The UE may, by spreading the signal, applying the OCC, and performing the DFT, generate the comb structure including a subset of subcarriers carrying non-zero signals representing the first UCI and the subcarrier index of the subset of subcarriers carrying the non-zero signals representing the second UCI.

In another aspect, the UE may directly map the first UCI to the subset of carriers. At 1313, the UE may map the first UCI having the first priority level to the subset of subcarriers without spreading. That is, instead of spreading the signal and applying OCC to the modulated data of the first UCI, the UCI may determine the subset of subcarriers to carry the non-zero signals based on the second UCI and directly map the codeword of the first UCI to the subset of subcarriers having the subcarrier index corresponding to the second UCI.

At 1314, the UE may transmit a DMRS on a second set of one or more symbols of the PUCCH. In one aspect, the set of resources may be the set of subcarriers, and the DMRS may be provided for the set of subcarriers. In another aspect, the set of resources may be a set of RBs, and the DMRS may be constrained within the RBs that carries the LP UCI. The base station may receive, from the UE, the DMRS on the second set of one or more symbols of the PUCCH. The base station may use the DMRS to estimate the PUCCH for decoding the PUCCH.

At 1316, the UE transmits the first codeword on the subset of subcarriers on the first set of one or more symbols of the PUCCH, where the first codeword carries on the subset of subcarriers may indicate the first UCI, and the subset of subcarriers may indicate second UCI having a second priority level. The base station receives the first codeword on the subset of subcarriers on the first set of one or more symbols of the PUCCH. In one aspect, the subcarrier index on which the first UCI is transmitted may indicate the information of the second UCI.

In one aspect, the UE may transmit the first UCI on the subset of subcarriers indicating the information for the second UCI based on a PUCCH format for the PUCCH. In another aspect, the UE may transmit the first UCI on the subset of subcarriers indicating the information for the second UCI based on the PUCCH format being based on a DFT-s-OFDM waveform.

At 1318, the UE may transmit the second UCI on a third set of one or more symbols of the PUCCH. That is, the UE may transmit the second UCI having the second priority level via at least one of the subcarrier index on the second set of one or more symbols used to transmit the first UCI having the first priority level, or the third set of one or more symbols dedicated to convey the second UCI payload. The base station may receive, from the UE, the second UCI on the third set of one or more symbols of the PUCCH.

At 1320, the base station decodes information about second UCI payload of a second priority level based on the subset of subcarriers on which the first UCI is received. That is, the base station may decode the first set of one or more symbols the PUCCH having the comb structure including the subset of subcarriers carrying non-zero signals, and decode the first UCI having the first priority level from the non-zero signal carried on the subset of subcarriers of the comb structure, and decode the second UCI having the second priority level from the subcarrier index of the subset of subcarriers carrying the non-zero signals.

At 1322, the base station may further decode the second UCI based on the second set of one or more symbols and the subset of subcarriers on which the first UCI is received.

Figure 14:
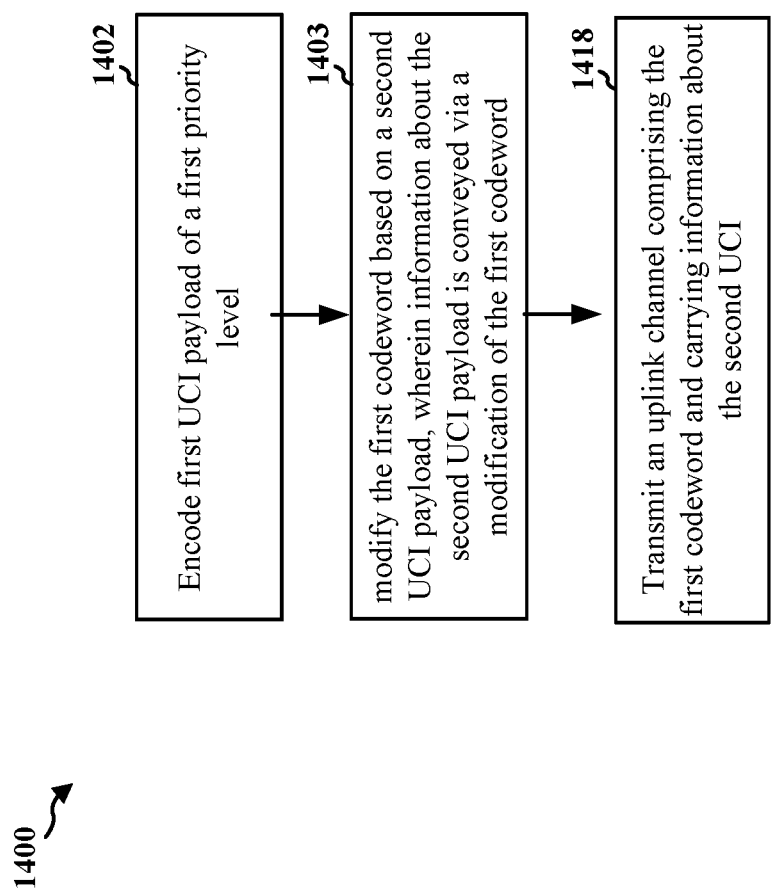
FIG. 14 is a flowchart of a method of wireless communication at a UE, in accordance with various aspects of the present disclosure.

FIG. 14 is a flowchart 1400 of a method of wireless communication. In some aspects, the method may be performed by a UE (e.g., the UE 104; 350, the base station 1702).

At 1402, the UE encodes a first UCI payload of a first priority level to generate a first codeword. The first UCI payload may correspond to the lower UCI payload described in connection with any of FIGS. 5A-9A, in some aspects. The encoding may be performed, e.g., by the UCI component 198 of the base station 1702 in FIG. 17.

At 1403, the UE modifies the first codeword based on a second UCI payload, wherein information about the second UCI payload is conveyed via a modification of the first codeword. The modification may be performed, e.g., by the UCI component 198 of the base station 1702 in FIG. 17.

At 1418, the UE transmits an uplink channel comprising the first codeword carrying information for the second UCI. The uplink channel may be a physical uplink shared channel (PUSCH). The uplink channel may be a physical uplink control channel (PUCCH). The transmission may be performed, e.g., by the UCI component 198 of the apparatus 1704 in FIG. 17 in FIG. 17 via an antenna 1780 and/or the transceiver 1722.

In some aspects, to modify the first codeword, the UE may embed information for a second UCI payload of a second priority level with the first codeword, e.g., as described in connection with FIG. 15. The first priority level may be lower than the second priority level. For example, the second UCI payload may correspond to the higher priority UCI payload described in connection with any of FIGS. 5A-9A. The embedding may be based on any of the aspects described in connection with 508, 608, 708, 808, or 908 in FIGS. 5A-9A. The embedding may be performed, e.g., by the UCI component 198 of the apparatus 1704 in FIG. 17.

In some aspects, to modify the first codeword, the UE may transmit the first codeword on subset of subcarriers of PUCCH indicating second UCI (e.g., mapping the first codeword to the subset of subcarriers of the PUCCH to indicate the information for the second UCI), as shown at 1522. In some aspects, the UE may multiplex the first UCI and the second UCI on a first set of one or more symbols of a PUCCH having a comb structure including a set of resources carrying the signal indicating the first UCI, and the set of resources of the first set of one or more symbols of the PUCCH indicating the information of the second UCI.

Figure 15:
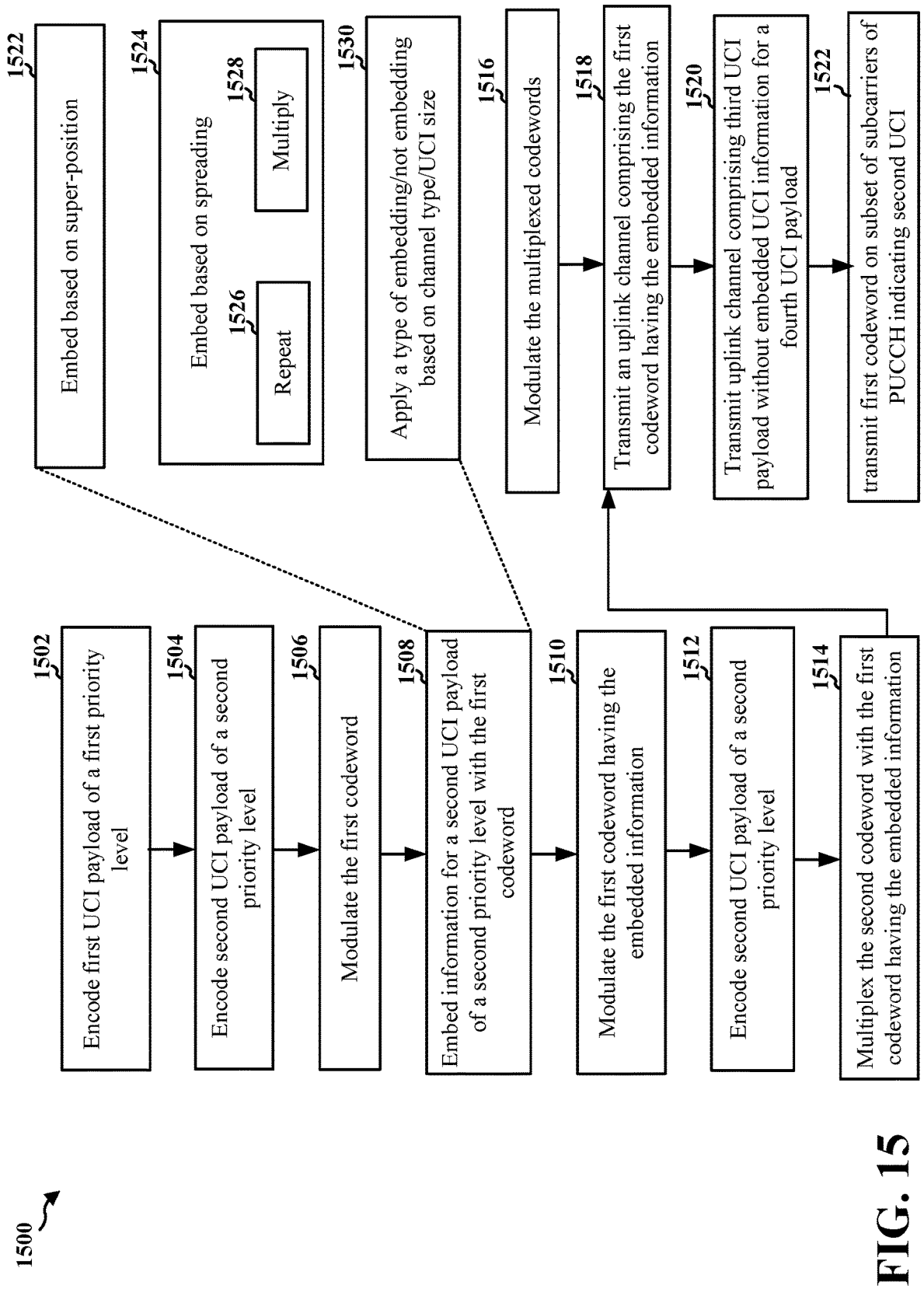
FIG. 15 is a flowchart of a method of wireless communication at a UE, in accordance with various aspects of the present disclosure.

FIG. 15 is a flowchart 1500 of a method of wireless communication. In some aspects, the method may be performed by a UE (e.g., the UE 104; 350, the base station 1702).

At 1502, the UE encodes a first UCI payload of a first priority level to generate a first codeword. The first UCI payload may correspond to the lower UCI payload described in connection with any of FIGS. 5A-9A, in some aspects. The encoding may be performed, e.g., by the UCI component 198 of the apparatus 1704 in FIG. 17.

At 1508, the UE embeds information for a second UCI payload of a second priority level with the first codeword. The first priority level may be lower than the second priority level. For example, the second UCI payload may correspond to the higher priority UCI payload described in connection with any of FIGS. 5A-9A. The embedding may be based on any of the aspects described in connection with 508, 608, 708, 808, or 908 in FIGS. 5A-9A. The embedding may be performed, e.g., by the UCI component 198 of the apparatus 1704 in FIG. 17.

At 1518, the UE transmits an uplink channel comprising the first codeword having the embedded information for the second UCI payload. The uplink channel may be a physical uplink shared channel (PUSCH). The uplink channel may be a physical uplink control channel (PUCCH). The transmission may be performed, e.g., by the UCI component 198 of the apparatus 1704 in FIG. 17 via the antenna 1780 and/or the transceiver 1722.

As illustrated at 1512, the UE may further encode the second UCI payload to generate a second codeword, e.g., as described in connection with encoder 1 in FIGS. 7A, 8A, and/or 9A. The encoding may be performed, e.g., by the UCI component 198 of the apparatus 1704 in FIG. 17. The encoder may correspond to the encoder 712 in FIGS. 7A-9A.

At 1514, the UE may multiplex the second codeword with the first codeword having the embedded information. The multiplexing may be performed by a UCI component 198 of the apparatus 1704 in FIG. 17. The multiplexing may include any of the aspects described in connection with 709, 809, or 909 in FIG. 7A, 8A, or 9A.

In some aspects, the multiplexing may be performed on a set of coded bits associated with the first codeword, e.g., at a bit level, and at 1516, the UE may modulate a multiplexed combination of the second codeword and the first codeword having the embedded information. For example, the information of the second UCI may be used to modify the bits directly (e.g., via XOR). FIG. 9A illustrates an example in which the modulation may be performed after the multiplexing. The modulation may be performed, e.g., by the UCI component 198 of the apparatus 1704 in FIG. 17.

In some aspects, the UE may modulate the first codeword to generate a first modulated symbol, at 1506, prior to the embedding, at 1508. The information for the second UCI payload may be embedded on the first modulation symbol, e.g., embedded at a symbol level. FIG. 7A illustrates an example in which the UE may modulate the codeword, at 706, prior to the embedding, at 708. The modulation may be performed, e.g., by the UCI component 198 of the apparatus 1704 in FIG. 17.

In some aspects, the information for the second UCI payload may be embedded on a set of coded bits associated with the first codeword, e.g., at a bit level, at 1508. As illustrated at 1510, the UE may modulate the first codeword having the embedded information to generate a first modulation symbol. The uplink channel may include the first symbol. The modulation may be performed, e.g., by the UCI component 198 of the apparatus 1704 in FIG. 17.

As illustrated at 1504, the UE may encode the second UCI payload to generate a second codeword, and the embedding the information, at 1508, may include super-positioning the second codeword on the first codeword, e.g., as illustrated at 1522. The second UCI payload may be encoded a single time in order to be embedded on the first UCI, as described in connection with FIG. 5A or 6A. In other aspects, the second UCI payload may be encoded an additional time, e.g., as described in connection with any of FIG. 7A, 8A, or 9A. The encoding at 1504 may be performed by the encoder 519 or 719 in FIG. 5A, 6A, 7A, 8A, or 9A.

In some aspects, the UE may encode the second UCI payload to generate a second codeword, at 1504, and the embedding the information, at 1508, may include spreading the first codeword based on the second codeword, at 1524. To spread the first codeword, the UE may repeat the first codeword a number of times, at 1526, and multiply each repetition of the first codeword with an element of the second codeword, at 1528.

In some aspects, the UE may perform the embedding based on a condition of one or more of the first UCI payload, the second UCI payload, or a type of the uplink channel. For example, at 1530, the UE may determine whether or not to embed and/or a type of embedding based on a condition. For example, the UE may apply a type of embedding based on a size of one or more of the first UCI payload and the second UCI payload. The UE may determine to embed the information about the second UCI based on the condition being met and may determine not to embed the information about the second UCI if the condition is not met. In other aspects, the UE may determine between different types of embedding based on the condition. The condition may include the second UCI payload having less than a threshold number of bits. The condition may include the first UCI payload and the second UCI payload together having less than a threshold number of bits. The condition may include the first UCI payload having less than a first threshold number of bits and the second UCI payload having less than a second threshold number of bits. As a further example, at 1520, the UE may transmit the uplink channel comprising a third UCI payload without embedded UCI information for a fourth UCI payload of the second priority level based on a number of bits of one or more of the third UCI payload or the fourth UCI payload being greater than a threshold number. In some aspects, the UE may apply a type of embedding (e.g., including whether or not to apply the embedding) based on a channel type. For example, the UE may apply a first type of embedding based for transmission on a physical uplink shared channel (PUSCH) or a second type of embedding for transmission on a physical uplink control channel (PUCCH). In other aspects, the UE may apply the embedding, at 1508, based on the UCI may transmitted on a PUSCH, and may determine not to embed the information if the UCI will be transmitted on a PUCCH.

In some aspects, the UE may transmit the first codeword on subset of subcarriers of PUCCH indicating second UCI, as shown at 1522. In some aspects, the UE may multiplex the first UCI and the second UCI on a first set of one or more symbols of a PUCCH having a comb structure including a set of resources carrying the signal indicating the first UCI, and the set of resources of the first set of one or more symbols of the PUCCH indicating the information of the second UCI.

In one aspect, the UE may multiplex the first UCI having the first priority level and the second UCI having the second priority level using a time-domain spreading and multiplying an OCC. The UE may spread a signal comprising the first UCI across a set of resources for each symbol of the first set of one or more symbols. In one aspect, the set of resources may be a set of subcarriers. In another aspect, the set of resources may be a set of RB s. In one aspect, the first UCI may be spread a first number of times. Here, the spreading the codeword including sequences of modulated data the first number of times may include repeating the sequences of modulated data the first number of times.

In some aspects, the set of subcarriers may include multiple subsets of subcarriers. In one aspect, a number of the subsets of subcarriers in the multiple subsets of subcarriers may be determined based on the payload size of the second UCI of the second priority level. In another aspect, the first UCI may be encoded to the first codeword based on the number of the subsets of subcarriers in the multiple subsets of subcarriers determined based on the payload size of the second UCI.

The UE may apply an OCC to the spread signal, the OCC being based on the second UCI. The OCC may be selected based on the second UCI, and the spread single applied with the selected OCC sequence may, after the DFT, generate the comb structure in a set of subcarriers, where the comb structure has a comb index representing the information of the second UCI having the second priority level.

The UE may perform a DFT after applying the OCC to the spread signal. The UE may, by spreading the signal, applying the OCC, and performing the DFT, generate the comb structure including a subset of subcarriers carrying non-zero signals representing the first UCI and the subcarrier index of the subset of subcarriers carrying the non-zero signals representing the second UCI.

In another aspect, the UE may directly map the first UCI to the subset of carriers. The UE may map the first UCI having the first priority level to the subset of subcarriers without spreading. That is, instead of spreading the signal and applying OCC to the modulated data of the first UCI, the UCI may determine the subset of subcarriers to carry the non-zero signals based on the second UCI and directly map the codeword of the first UCI to the subset of subcarriers having the subcarrier index corresponding to the second UCI.

The UE may transmit a DMRS on a second set of one or more symbols of the PUCCH. In one aspect, the set of resources may be the set of subcarriers, and the DMRS may be provided for the set of subcarriers. In another aspect, the set of resources may be a set of RBs, and the DMRS may be constrained within the RBs that carry the LP UCI.

The UE may transmit the first codeword on the subset of subcarriers on the first set of one or more symbols of the PUCCH, where the first codeword carries on the subset of subcarriers may indicate the first UCI, and the subset of subcarriers may indicate second UCI having a second priority level. In one aspect, the subcarrier index on which the first UCI is transmitted may indicate the information of the second UCI.

In one aspect, the UE may transmit the first UCI on the subset of subcarriers indicating the information for the second UCI based on a PUCCH format for the PUCCH. In another aspect, the UE may transmit the first UCI on the subset of subcarriers indicating the information for the second UCI based on the PUCCH format being based on a DFT-s-OFDM waveform.

The UE may transmit the second UCI on a third set of one or more symbols of the PUCCH. That is, the UE may transmit the second UCI having the second priority level via at least one of the subcarrier index on the second set of one or more symbols used to transmit the first UCI having the first priority level, or the third set of one or more symbols dedicated to convey the second UCI payload.

Figure 16B:
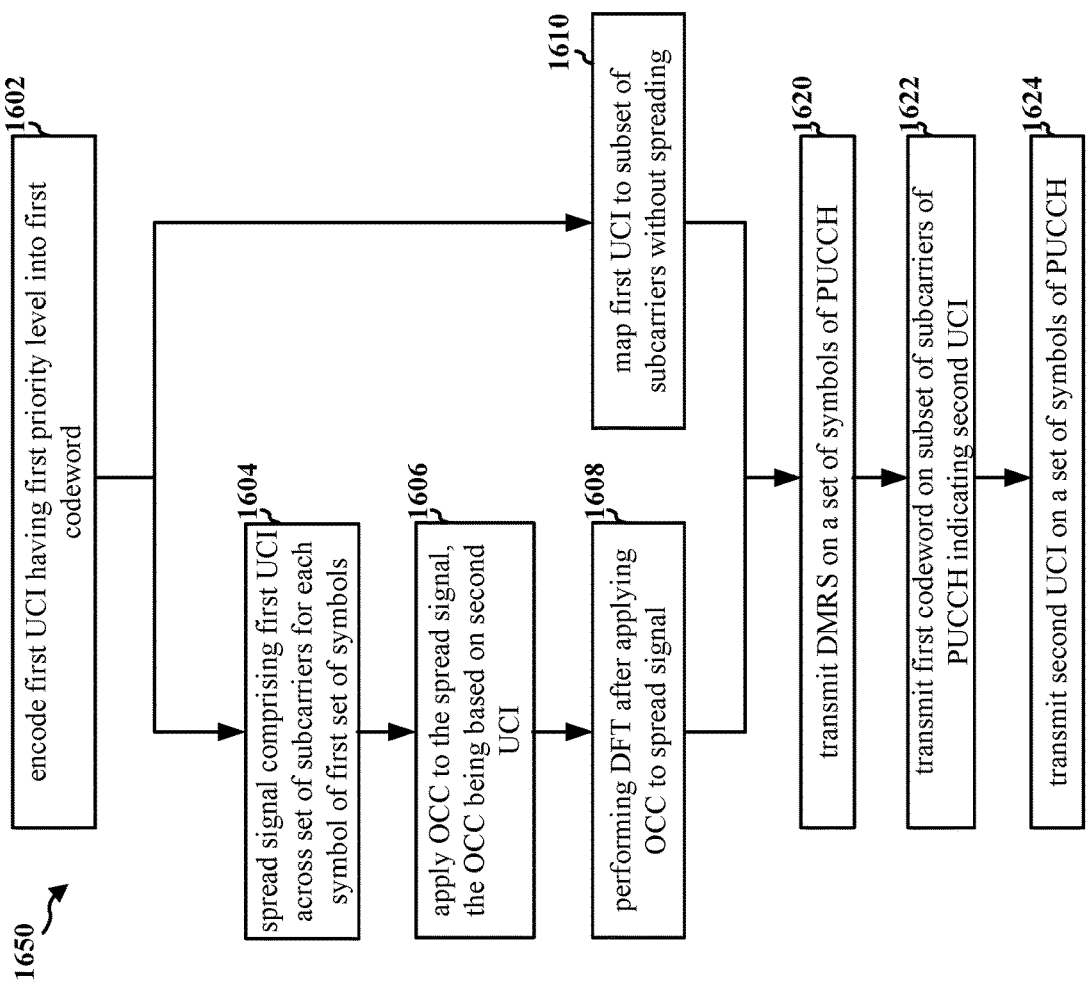
FIG. 16A and FIG. 16B are flowcharts of methods of wireless communication at a UE.
Figure 16A:
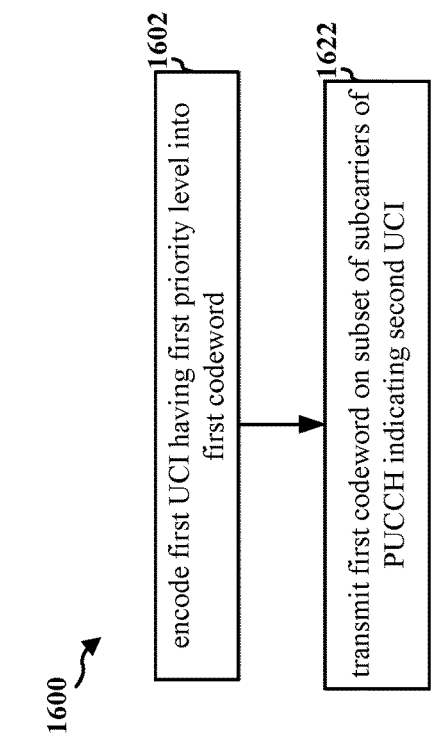

FIG. 16A is a flowchart 1600 of a method of wireless communication. The method may be performed by a UE (e.g., the UE 104, 350, 1302; the apparatus 1704). The UE may multiplex first UCI having a first priority level and second UCI having a second priority level on a PUCCH, the second priority level different from the first priority level. For example, the UE may multiplex HP UCI having a high priority level and LP UCI having a low priority level on the PUCCH.

At 1602, the UE encodes the first UCI having the first priority level into a first codeword. In one aspect, the first UCI may include LP UCI. The UE may receive the first UCI and encode and modulate the first UCI into a first codeword. For example, 1602 may be performed by a UCI reception component 199.

At 1622, the UE transmits the first codeword on the subset of subcarriers on the first set of one or more symbols of the PUCCH, where the first codeword carries on the subset of subcarriers may indicate the first UCI, and the subset of subcarriers may indicate second UCI having a second priority level. In one aspect, the subcarrier index on which the first UCI is transmitted may indicate the information of the second UCI. For example, 1622 may be performed by the UCI component 198.

FIG. 16B is a flowchart 1650 of a method of wireless communication. The method may be performed by a UE (e.g., the UE 104, 350, 1302; the apparatus 1704). The UE may multiplex first UCI having a first priority level and second UCI having a second priority level on a PUCCH, the second priority level different from the first priority level. For example, the UE may multiplex HP UCI having a high priority level and LP UCI having a low priority level on the PUCCH.

At 1602, the UE encodes the first UCI having the first priority level into a first codeword. In one aspect, the first UCI may include LP UCI. The UE may receive the first UCI and encode and modulate the first UCI into a first codeword. For example, 1602 may be performed by a UCI reception component 199.

In some aspects, the UE may multiplex the first UCI and the second UCI on a first set of one or more symbols of a PUCCH having a comb structure including a set of resources carrying the signal indicating the first UCI, and the set of resources of the first set of one or more symbols of the PUCCH indicating the information of the second UCI.

In one aspect, the UE may multiplex the first UCI having the first priority level and the second UCI having the second priority level using a time-domain spreading and multiplying an OCC. At 1604, the UE may spread a signal comprising the first UCI across a set of resources for each symbol of the first set of one or more symbols. In one aspect, the set of resources may be a set of subcarriers. In another aspect, the set of resources may be a set of RB s. In one aspect, the first UCI may be spread a first number of times. Here, the spreading the codeword including sequences of modulated data the first number of times may include repeating the sequences of modulated data the first number of times. For example, 1604 may be performed by the UCI reception component 199.

In some aspects, the set of subcarriers may include multiple subsets of subcarriers. In one aspect, a number of the subsets of subcarriers in the multiple subsets of subcarriers may be determined based on the payload size of the second UCI of the second priority level. In another aspect, the first UCI may be encoded to the first codeword based on the number of the subsets of subcarriers in the multiple subsets of subcarriers determined based on the payload size of the second UCI.

At 1606, the UE may apply an OCC to the spread signal, the OCC being based on the second UCI. The OCC may be selected based on the second UCI, and the spread single applied with the selected OCC sequence may, after the DFT, generate the comb structure in a set of subcarriers, where the comb structure has a comb index representing the information of the second UCI having the second priority level. For example, 1606 may be performed by the UCI component 198.

At 1608, the UE may perform a DFT after applying the OCC to the spread signal. The UE may, by spreading the signal, applying the OCC, and performing the DFT, generate the comb structure including a subset of subcarriers carrying non-zero signals representing the first UCI and the subcarrier index of the subset of subcarriers carrying the non-zero signals representing the second UCI. For example, 1608 may be performed by the UCI component 198.

In another aspect, the UE may directly map the first UCI to the subset of carriers. At 1610, the UE may map the first UCI having the first priority level to the subset of subcarriers without spreading. That is, instead of spreading the signal and applying OCC to the modulated data of the first UCI, the UCI may determine the subset of subcarriers to carry the non-zero signals based on the second UCI and directly map the codeword of the first UCI to the subset of subcarriers having the subcarrier index corresponding to the second UCI. For example, 1610 may be performed by the UCI component 198.

At 1620, the UE may transmit a DMRS on a second set of one or more symbols of the PUCCH. In one aspect, the set of resources may be the set of subcarriers, and the DMRS may be provided for the set of subcarriers. In another aspect, the set of resources may be a set of RBs, and the DMRS may be constrained within the RBs that carry the LP UCI. For example, 1620 may be performed by UCI component 198.

At 1622, the UE transmits the first codeword on the subset of subcarriers on the first set of one or more symbols of the PUCCH, where the first codeword carries on the subset of subcarriers may indicate the first UCI, and the subset of subcarriers may indicate second UCI having a second priority level. In one aspect, the subcarrier index on which the first UCI is transmitted may indicate the information of the second UCI. For example, 1622 may be performed by the UCI component 198.

In one aspect, the UE may transmit the first UCI on the subset of subcarriers indicating the information for the second UCI based on a PUCCH format for the PUCCH. In another aspect, the UE may transmit the first UCI on the subset of subcarriers indicating the information for the second UCI based on the PUCCH format being based on a DFT-s-OFDM waveform.

At 1624, the UE may transmit the second UCI on a third set of one or more symbols of the PUCCH. That is, the UE may transmit the second UCI having the second priority level via at least one of the subcarrier index on the second set of one or more symbols used to transmit the first UCI having the first priority level, or the third set of one or more symbols dedicated to convey the second UCI payload. For example, 1624 may be performed by the UCI component 198.

Figure 17:
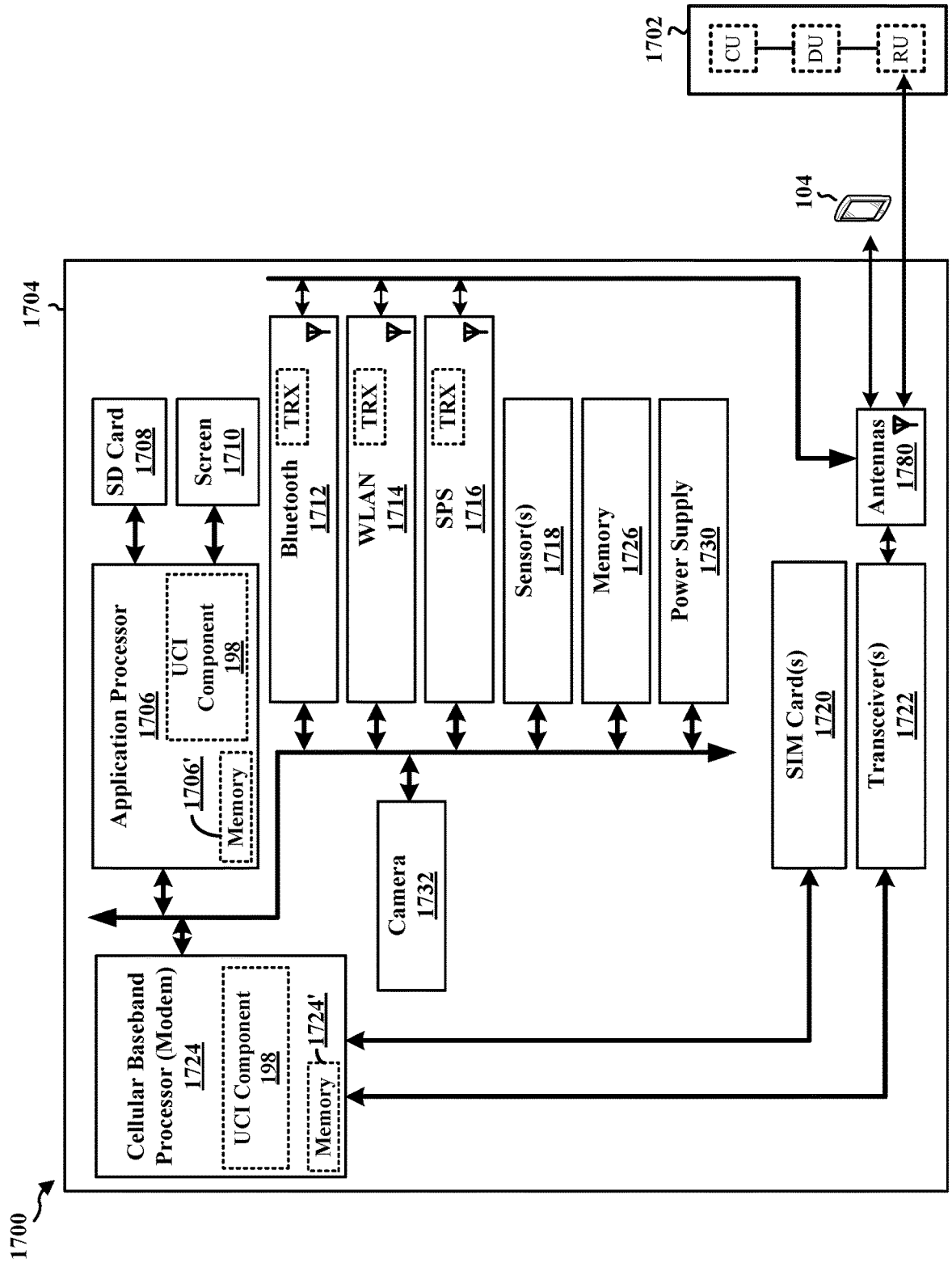
FIG. 17 is a diagram illustrating an example of a hardware implementation for an example apparatus, in accordance with various aspects of the present disclosure.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a base station 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed in connection with any of FIGS. 14-16B, the UCI component 198 may be configured to encode a first UCI payload of a first priority level to generate a first codeword, encode the second UCI payload to generate a second codeword, encode the second UCI payload to generate a second codeword, wherein embedding the information comprises super-positioning the second codeword on the first codeword, embed information for a second UCI payload of a second priority level with the first codeword, modulate a multiplexed combination of the second codeword and the first codeword having the embedded information, modulate the first codeword to generate a first symbol prior to the embedding, and/or modulate the first codeword having the embedded information to generate a first symbol, multiplex the second codeword with the first codeword having the embedded information, transmit an uplink channel comprising the first codeword having the embedded information for the second UCI payload, and/or transmit the uplink channel comprising a third UCI payload without embedded UCI information for a fourth UCI payload of the second priority level based on a number of bits of one or more of the third UCI payload or the fourth UCI payload being greater than a threshold number. The UCI component may be configured to encode the first UCI having the first priority level into a first codeword, spread a signal comprising the first UCI across a set of resources for each symbol of the first set of one or more symbols, apply an OCC to the spread signal, the OCC being based on the second UCI, perform a DFT after applying the OCC to the spread signal, and map the first UCI having the first priority level to the subset of subcarriers without spreading, transmit a DMRS on a second set of one or more symbols of the PUCCH, transmit the first codeword on the subset of subcarriers on the first set of one or more symbols of the PUCCH, where the first codeword carries on the subset of subcarriers may indicate the first UCI, and the subset of subcarriers may indicate second UCI having a second priority level, and transmit the second UCI on a third set of one or more symbols of the PUCCH.

The UCI component may be configured to perform each of the blocks of the algorithm in the flowcharts of any of FIG. 14, FIG. 15, FIG. 16A, FIG. 16B, and/or the aspects described in connection with any of FIGS. 5A-13. As such, each block in the flowchart of FIG. 14, FIG. 15, FIG. 16A, FIG. 16B and/or the aspects described in connection with any of FIGS. 5A-13 may be performed by the UCI component or one or more additional components and the apparatus, e.g., 1702, may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for means for encoding a first UCI payload of a first priority level to generate a first codeword, means for embedding information for a second UCI payload of a second priority level with the first codeword, and means for transmitting an uplink channel comprising the first codeword having the embedded information for the second UCI payload. The apparatus 1704 may further include means for encoding the second UCI payload to generate a second codeword and means for multiplexing the second codeword with the first codeword having the embedded information. The apparatus 1704 may further include means for modulating a multiplexed combination of the second codeword and the first codeword having the embedded information. The apparatus 1704 may further include means for modulating the first codeword to generate a first symbol prior to the embedding, wherein the information for the second UCI payload is embedded at a symbol level. The apparatus 1704 may further include means for modulating the first codeword having the embedded information to generate a first symbol, wherein the uplink channel comprises the first symbol. The apparatus 1704 may further include means for encoding the second UCI payload to generate a second codeword, wherein embedding the information comprises super-positioning the second codeword on the first codeword. The apparatus 1704 may further include means for encoding the second UCI payload to generate a second codeword, wherein embedding the information comprises spreading the first codeword based on the second codeword. The apparatus 1704 may further include means for repeating the first codeword a number of times; and means for multiplying each repetition of the first codeword with an element of the second codeword. The apparatus 1704 may further include means for performing the embedding based on a condition of one or more of the first UCI payload, the second UCI payload, or a type of the uplink channel. The apparatus 1704 may further include means for applying a type of embedding based on a size of one or more of the first UCI payload and the second UCI payload. The apparatus 1704 may further include means for transmitting the uplink channel comprising a third UCI payload without embedded UCI information for a fourth UCI payload of the second priority level based on a number of bits of one or more of the third UCI payload or the fourth UCI payload being greater than a threshold number. The apparatus 1704 may further include means for applying a type of embedding based on a channel type, wherein the UE applies a first type of embedding based for transmission on a PUSCH or a second type of embedding for transmission on a PUCCH. encoding first UCI having a first priority level into a first codeword, and means for transmitting the first codeword on a subset of subcarriers on a first set of one or more symbols of a PUCCH, wherein the first codeword indicates the first UCI, and the set of subcarriers indicate second UCI having a second priority level. The apparatus 1704 may further include means for transmitting a DMRS on a second set of one or more symbols of the PUCCH, and means for transmitting the second UCI on a second set of one or more symbols of the PUCCH. The apparatus 1704 may further include means for spreading a signal comprising the first UCI across a set of subcarriers for each symbol of the first set of one or more symbols, means for applying an OCC to the spread signal, the OCC being based on the second UCI, and means for performing a DFT after applying the OCC to the spread signal. The apparatus 1704 may further include means for mapping the first UCI to the subset of subcarriers without spreading. The apparatus 1704 may further include means to perform any of the aspects described in connection with FIGS. 14-16B. The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figures 18A, 18B:
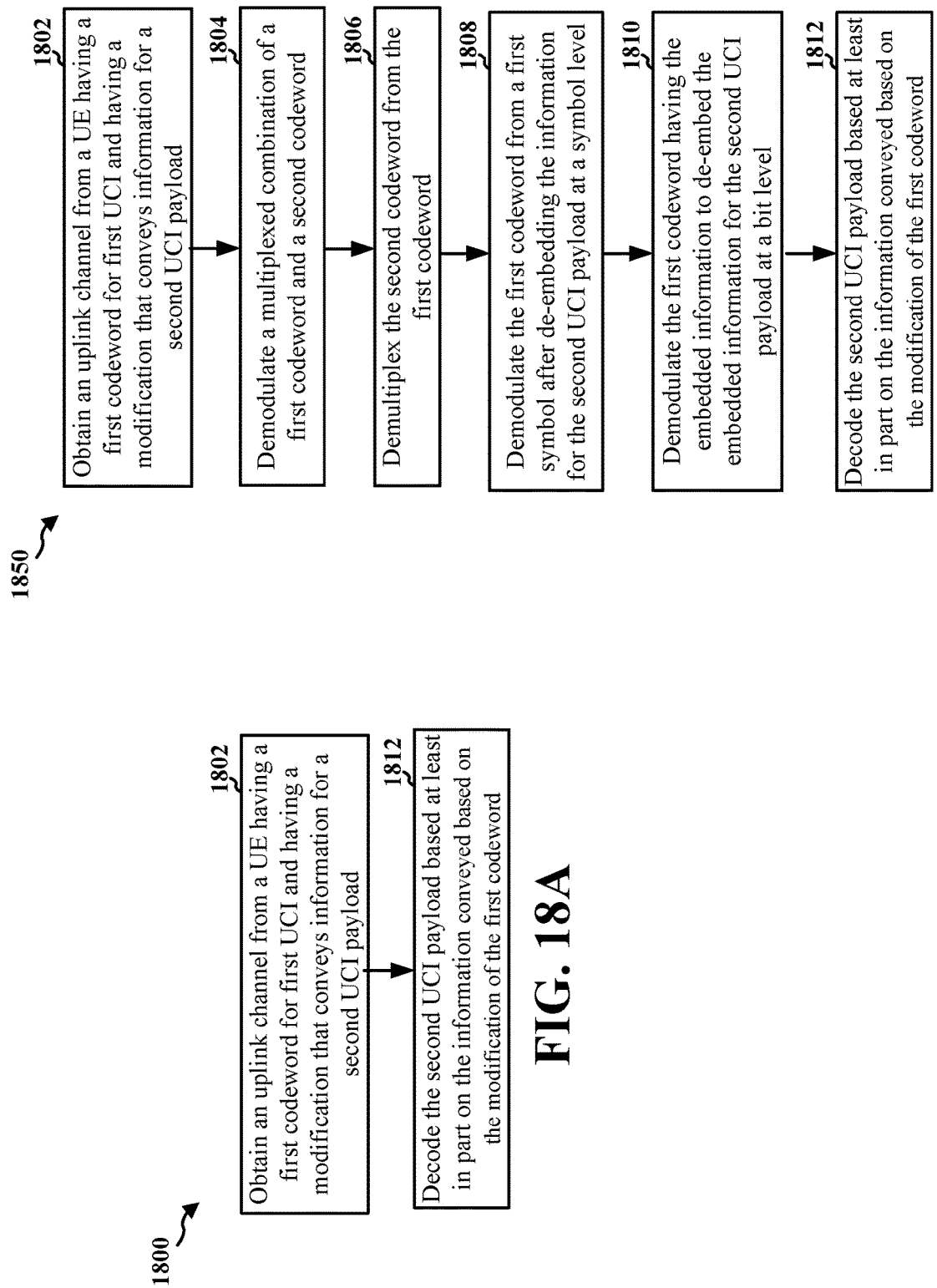
FIG. 18A and FIG. 18B are flowcharts of methods of wireless communication at a base station, in accordance with various aspects of the present disclosure.

FIG. 18A is a flowchart 1800 of a method of wireless communication. The method may be performed by a base station (e.g., the base station 102, 310; the base station 2002). The base station may be a base station in an aggregated configuration, a disaggregated base station, a portion of a disaggregated base station, etc. (a node that performs some full or partial base station functionality). In some aspects, the base station may take the form of an CU, DU, RU, (individually or collectively).

At 1802, the base station obtains an uplink channel from a UE, comprising a first codeword for a first UCI payload having a first priority level and having a modification that conveys information for a second UCI payload having a second priority level. For example, the base station may receive the uplink channel from the UE. The reception may be performed, e.g., by the UCI reception component 199 of the base station 2002 in FIG. 20. The first UCI payload may correspond to the lower UCI payload described in connection with any of FIGS. 5A-9A, in some aspects. The first priority level may be lower than the second priority level. For example, the second UCI payload may correspond to the higher priority UCI payload described in connection with any of FIGS. 5A-9A. The information may be embedded based on any of the aspects described in connection with 508, 608, 708, 808, or 908 in FIGS. 5A-9A. The uplink channel may be a physical uplink shared channel (PUSCH). The uplink channel may be a physical uplink control channel (PUCCH). The embedded information may be super-positioned on the first codeword.

At 1812, the base station decodes the second UCI payload based at least in part on the information conveyed based on the modification of the first codeword. The decoding may be based on the aspects described in connection with any of FIG. 5B, 6B, 7B, 8B, or 9B, for example. In some aspects, the base station may de-embed the information about the second UCI from the codeword for the first UCI, e.g., as described in connection with any of the aspects of FIG. 18B. The decoding may be performed, e.g., by the UCI reception component 199 of the base station 2002 in FIG. 20. In other aspects, the base station may decode information about second UCI payload of second priority level based on subset of subcarriers on which first UCI is received, e.g., as described in connection with any of the aspects of FIG. 19A or 19B.

FIG. 18B is a flowchart 1850 of a method of wireless communication. The method may be performed by a base station (e.g., the base station 102, 310; the network entity 1802). The base station may be a base station in an aggregated configuration, a disaggregated base station, a portion of a disaggregated base station, etc. (a node that performs some full or partial base station functionality). In some aspects, the base station may take the form of an CU, DU, RU, (individually or collectively).

At 1802, the network entity obtains, e.g., receives, an uplink channel from a UE, comprising a first codeword for a first UCI payload having a first priority level and having embedded information for a second UCI payload having a second priority level. The reception may be performed by the UCI reception component 199 of the network entity 2002. The first UCI payload may correspond to the lower UCI payload described in connection with any of FIGS. 5A-9A, in some aspects. The first priority level may be lower than the second priority level. For example, the second UCI payload may correspond to the higher priority UCI payload described in connection with any of FIGS. 5A-9A. The information may be embedded based on any of the aspects described in connection with 508, 608, 708, 808, or 908 in FIGS. 5A-9A. The uplink channel may be a physical uplink shared channel (PUSCH). The uplink channel may be a physical uplink control channel (PUCCH). The embedded information may be super-positioned on the first codeword. In other aspects, the base station may receive the first codeword by de-spreading the first codeword based on a second codeword for the second UCI payload.

At 1812, the base station decodes the second UCI payload based at least in part on the embedded information. The decoding may be based on the aspects described in connection with any of FIG. 5B, 6B, 7B, 8B, or 9B, for example. For example, the base station may de-embed the information about the second UCI from the codeword for the first UCI. The decoding may be performed by the UCI reception component 199 of the base station 2002.

As illustrated at 1806, the UE may de-multiplex a second codeword for the second UCI payload from the first codeword having the embedded information, where the base station decodes the second UCI payload from the second codeword based on the embedded information with the first codeword. FIGS. 7B, 8B, and 9B illustrate examples in which the receiver de-multiplexes the two UCI codewords. The de-multiplexing may be performed by the UCI reception component 199 of the base station 2002.

In some aspects, the demultiplexing may be performed at a bit level. At 1804, the base station may demodulate a multiplexed combination of the second codeword and the first codeword having the embedded information. FIG. 9B illustrates an example that includes demultiplexing at a bit level. The demodulation may be performed by the UCI reception component 199 of the base station 2002.

At 1808, the base station may demodulate the first codeword from a first modulation symbol after de-embedding the information for the second UCI on the first modulation symbol. FIG. 7B illustrates an example of demodulation after de-embedding the information about the second UCI. The demodulation may be performed by the UCI reception component 199 of the base station 2002.

At 1810, the base station may demodulate the first codeword having the embedded information to de-embed the embedded information for the second UCI payload on a set of coded bits associated with the first codeword, e.g., at a bit level. FIG. 8B illustrates an example of demodulation before de-embedding the information about the second UCI. The demodulation may be performed by the UCI reception component 199 of the base station 2002.

The base station may receive, from the UE, the DMRS on the second set of one or more symbols of the PUCCH. The base station may use the DMRS to estimate the PUCCH for decoding the PUCCH. In one aspect, the set of resources may be the set of subcarriers, and the DMRS may be provided for the set of subcarriers. In another aspect, the set of resources may be a set of RB s, and the DMRS may be constrained within the RB s that carry the LP UCI. For example, 1920 may be performed by the UCI reception component 199 of the base station 2002.

The base station may receive the first codeword on the subset of subcarriers on the first set of one or more symbols of the PUCCH, where the first codeword carries on the subset of subcarriers may indicate the first UCI, and the subset of subcarriers may indicate second UCI having a second priority level. In one aspect, the subcarrier index on which the first UCI is transmitted may indicate the information of the second UCI. For example, 1922 may be performed by the UCI reception component 199 of the base station 2002.

The base station may receive, from the UE, the second UCI on the third set of one or more symbols of the PUCCH. For example, 1924 may be performed by the UCI reception component 199 of the base station 2002.

The base station may decode information about the second UCI payload of the second priority level based on the subset of subcarriers on which the first UCI is received. That is, the base station may decode the first set of one or more symbols the PUCCH having the comb structure including the subset of subcarriers carrying non-zero signals, and decode the first UCI having the first priority level from the non-zero signal carried on the subset of subcarriers of the comb structure, and decode the second UCI having the second priority level indicated by the subcarrier index of the subset of subcarriers carrying the non-zero signals. For example, 1926 may be performed by the UCI reception component 199 of the base station 2002.

The base station may further decode the second UCI based on the second set of one or more symbols and the subset of subcarriers on which the first UCI is received. That is, the base station may receive the second UCI having the second priority level via at least one of the subcarrier index on the second set of one or more symbols used to transmit the first UCI having the first priority level, or the third set of one or more symbols dedicated to convey the second UCI payload. For example, 1928 may be performed by the UCI reception component 199 of the base station 2002.

FIG. 19A is a flowchart 1900 of a method of wireless communication. The method may be performed by a base station (e.g., the base station 102, 310, 1304; the base station 2002). The base station may be a base station in an aggregated configuration, a disaggregated base station, a portion of a disaggregated base station, etc. (a node that performs some full or partial base station functionality). In some aspects, the base station may take the form of an CU, DU, RU, (individually or collectively).

The base station may receive, from a UE, first UCI having a first priority level and second UCI having a second priority level multiplexed on a PUCCH, the second priority level different from the first priority level. For example, the first UCI may be LP UCI having a low priority level on the PUCCH, and the second UCI may be HP UCI having a high priority level.

At 1922, the base station receives the first codeword on the subset of subcarriers on the first set of one or more symbols of the PUCCH, where the first codeword carries on the subset of subcarriers may indicate the first UCI, and the subset of subcarriers may indicate second UCI having a second priority level. In one aspect, the subcarrier index on which the first UCI is transmitted may indicate the information of the second UCI. For example, 1922 may be performed by the UCI reception component 199 of the base station 2002.

At 1926, the base station decodes information about the second UCI payload of the second priority level based on the subset of subcarriers on which the first UCI is received. That is, the base station may decode the first set of one or more symbols the PUCCH having the comb structure including the subset of subcarriers carrying non-zero signals, and decode the first UCI having the first priority level from the non-zero signal carried on the subset of subcarriers of the comb structure, and decode the second UCI having the second priority level indicated by the subcarrier index of the subset of subcarriers carrying the non-zero signals. For example, 1926 may be performed by the UCI reception component 199 of base station 2002.

FIG. 19B is a flowchart 1950 of a method of wireless communication. The method may be performed by a base station (e.g., the base station 102, 310, 1304; the base station 2002). The base station may be a base station in an aggregated configuration, a disaggregated base station, a portion of a disaggregated base station, etc. (a node that performs some full or partial base station functionality). In some aspects, the base station may take the form of an CU, DU, RU, (individually or collectively).

The base station may receive, from a UE, first UCI having a first priority level and second UCI having a second priority level multiplexed on a PUCCH, the second priority level different from the first priority level. For example, the first UCI may be LP UCI having a low priority level on the PUCCH, and the second UCI may be HP UCI having a high priority level.

At 1920, the base station may receive, from the UE, the DMRS on the second set of one or more symbols of the PUCCH. The base station may use the DMRS to estimate the PUCCH for decoding the PUCCH. In one aspect, the set of resources may be the set of subcarriers, and the DMRS may be provided for the set of subcarriers. In another aspect, the set of resources may be a set of RBs, and the DMRS may be constrained within the RBs that carry the LP UCI. For example, 1920 may be performed by the UCI reception component 199 of the base station 2002.

At 1922, the base station receives the first codeword on the subset of subcarriers on the first set of one or more symbols of the PUCCH, where the first codeword carries on the subset of subcarriers may indicate the first UCI, and the subset of subcarriers may indicate second UCI having a second priority level. In one aspect, the subcarrier index on which the first UCI is transmitted may indicate the information of the second UCI. For example, 1922 may be performed by the UCI reception component 199 of the base station 2002.

At 1924, the base station may receive, from the UE, the second UCI on the third set of one or more symbols of the PUCCH. For example, 1924 may be performed by the UCI reception component 199 of the base station 2002.

At 1926, the base station decodes information about the second UCI payload of the second priority level based on the subset of subcarriers on which the first UCI is received. That is, the base station may decode the first set of one or more symbols the PUCCH having the comb structure including the subset of subcarriers carrying non-zero signals, and decode the first UCI having the first priority level from the non-zero signal carried on the subset of subcarriers of the comb structure, and decode the second UCI having the second priority level indicated by the subcarrier index of the subset of subcarriers carrying the non-zero signals. For example, 1926 may be performed by the UCI reception component 199 of the base station 2002.

At 1928, the base station may further decode the second UCI based on the second set of one or more symbols and the subset of subcarriers on which the first UCI is received. That is, the base station may receive the second UCI having the second priority level via at least one of the subcarrier index on the second set of one or more symbols used to transmit the first UCI having the first priority level, or the third set of one or more symbols dedicated to convey the second UCI payload. For example, 1928 may be performed by the UCI reception component 199 of the base station 2002.

Figure 20:
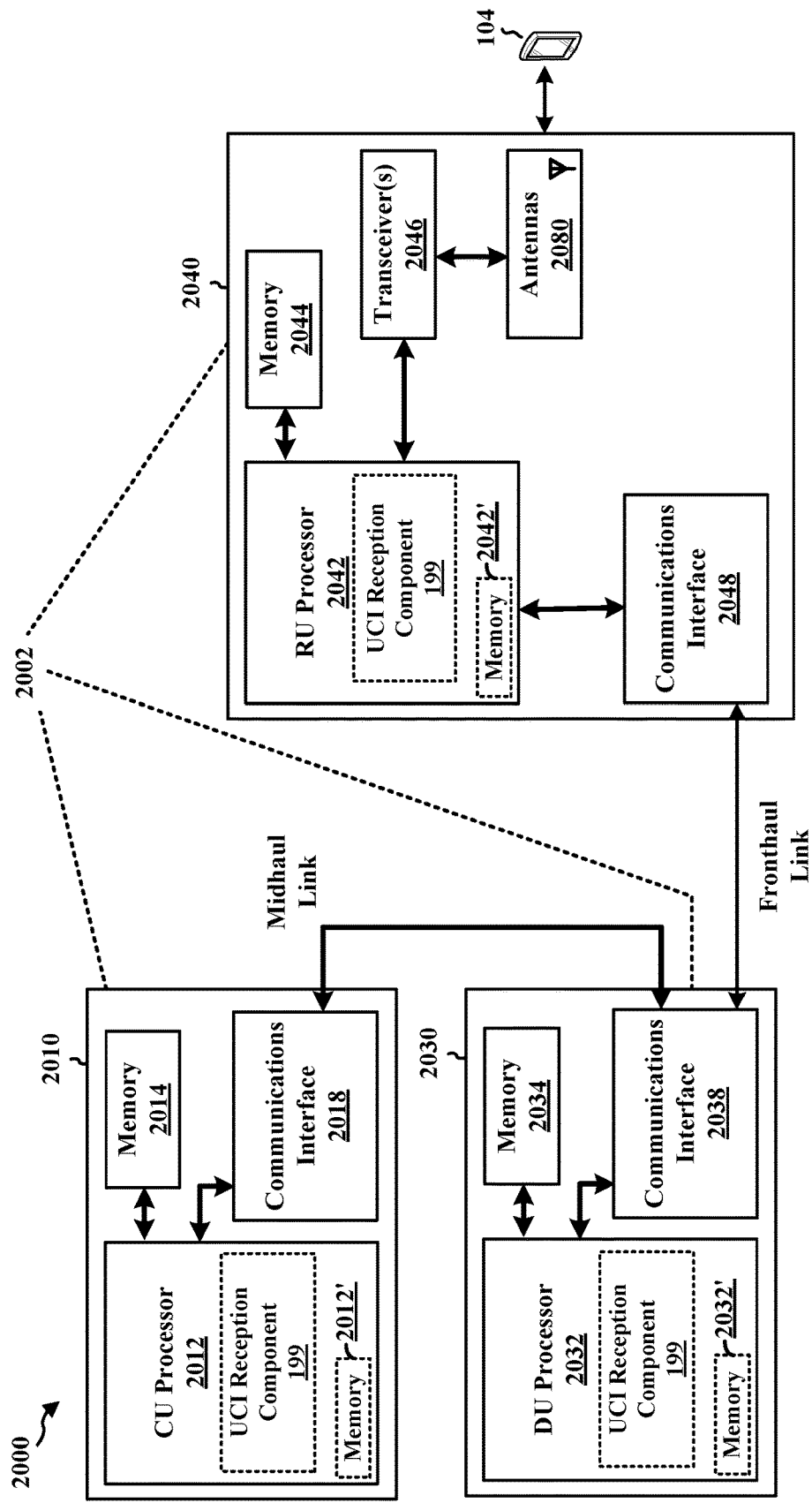
FIG. 20 is a diagram illustrating an example of a hardware implementation for an example apparatus, in accordance with various aspects of the present disclosure.

FIG. 20 is a diagram 2000 illustrating an example of a hardware implementation for a base stations 2002. The base station 2002 may be a BS, a component of a BS, or may implement BS functionality. The base station 2002 may include at least one of a CU 2010, a DU 2030, or an RU 2040, any combination of which may be configured to perform the aspects described in connection with FIGS. 18A, 18B, 19A, and/or 19B. For example, depending on the layer functionality handled by the component 199, the base station 2002 may include the CU 2010; both the CU 2010 and the DU 2030; each of the CU 2010, the DU 2030, and the RU 2040; the DU 2030; both the DU 2030 and the RU 2040; or the RU 2040. The CU 2010 may include a CU processor 2012. The CU processor 2012 may include on-chip memory 2012'. In some aspects, the CU 2010 may further include additional memory modules 2014 and a communications interface 2018. The CU 2010 communicates with the DU 2030 through a midhaul link, such as an F1 interface. The DU 2030 may include a DU processor 2032. The DU processor 2032 may include on-chip memory 2032'. In some aspects, the DU 2030 may further include additional memory modules 2034 and a communications interface 2038. The DU 2030 communicates with the RU 2040 through a fronthaul link. The RU 2040 may include an RU processor 2042. The RU processor 2042 may include on-chip memory 2042'. In some aspects, the RU 2040 may further include additional memory modules 2044, one or more transceivers 2046, antennas 2080, and a communications interface 2048. The RU 2040 communicates with the UE 104. The on-chip memory 2012', 2032', 2042' and the additional memory modules 2014, 2034, 2044 may each be considered a computer-readable medium/memory. Each computer-readable medium/memory may be non-transitory. Each of the processors 2012, 2032, 2042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed in connection with FIGS. 18A-19B, the UCI reception component 199 may be configured to receive an uplink channel from a UE, comprising a first codeword for a first UCI payload having a first priority level and having embedded information for a second UCI payload having a second priority level, de-multiplex a second codeword for the second UCI payload from the first codeword having the embedded information, perform a demodulation, decode the second UCI payload based at least in part on the embedded information, decode information about second UCI payload of a second priority level based on the subset of subcarriers on which the first UCI is received, and decode the second UCI based on the second set of one or more symbols and the subset of subcarriers on which the first UCI is received, receive, from the UE, the DMRS on the second set of one or more symbols of the PUCCH, receive the first codeword on the subset of subcarriers on the first set of one or more symbols of the PUCCH, where the first codeword carries on the subset of subcarriers may indicate the first UCI, and the subset of subcarriers may indicate second UCI having a second priority level, and/or receive, from the UE, the second UCI on the third set of one or more symbols of the PUCCH. The component 199 may be within one or more processors of one or more of the CU 2010, DU 2030, and the RU 2040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The base station may include additional components that perform each of the blocks of the algorithm in the flowcharts of any of FIGS. 18A-19B, and/or the aspects described in connection with FIGS. 5B-13. As such, each block in the flowchart of FIGS. 18A-19B, and/or the aspects described in connection with FIGS. 5B-13, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The base station 2002 may include a variety of components configured for various functions. In one configuration, the base station 2002 includes means for receiving an uplink channel from a UE, comprising a first codeword for a first UCI payload having a first priority level and having embedded information for a second UCI payload having a second priority level and means for decoding the second UCI payload based at least in part on the embedded information. The base station 2002 may further include means for demultiplexing a second codeword for the second UCI payload from the first codeword having the embedded information. The base station 2002 may further include means for demodulating a multiplexed combination of the second codeword and the first codeword having the embedded information. The base station 2002 may further include means for demodulating the first codeword from a first symbol after de-embedding the information for the second UCI payload at a symbol level. The base station 2002 may further include means for demodulating the first codeword having the embedded information to de-embed the embedded information for the second UCI payload at a bit level. The base station 2002 may further include means for receiving first UCI of a first priority level on a subset of subcarriers in a first set of one or more symbols of a PUCCH, and means for decoding information about second UCI payload of a second priority level based on the subset of subcarriers on which the first UCI is received. The base station 2002 may further include means for receiving a DMRS on a second set of one or more symbols of the PUCCH, means for receiving the second UCI on a second set of one or more symbols of the PUCCH, and means for decoding the second UCI based on the second set of one or more symbols and the subset of subcarriers on which the first UCI is received. The means may be the component 199 of the base station 2002 configured to perform the functions recited by the means. The base station 2002 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: encoding a first uplink control information (UCI) payload of a first priority level to generate a first codeword; modify the first codeword based on a second UCI payload, wherein information about the second UCI payload is conveyed via a modification of the first codeword; and transmitting an uplink channel comprising the first codeword and carrying the information for the second UCI payload.

In aspect 2, the method of aspect 1 may further include embedding information for a second UCI payload of a second priority level with the first codeword; and transmitting an uplink channel comprising the first codeword having the embedded information for the second UCI payload.

In aspect 3, the method of aspect 1 or aspect 2 further includes that the first priority level is lower than the second priority level.

In aspect 4, the method of any of aspects 1-3 further includes that the uplink channel comprises a physical uplink shared channel (PUSCH).

In aspect 5, the method of any of aspects 1-3 further includes that the uplink channel comprises a physical uplink control channel (PUCCH).

In aspect 6, the method of any of aspects 1-5 further includes encoding the second UCI payload to generate a second codeword; and multiplexing the second codeword with the first codeword having the embedded information.

In aspect 7, the method of aspect 6 further includes that the multiplexing is performed at a bit level, the method further comprising: modulating a multiplexed combination of the second codeword and the first codeword having the embedded information.

In aspect 8, the method of aspect any of aspects 1-6 further includes that modulating the first codeword to generate a first modulation symbol prior to the embedding, wherein the information for the second UCI payload is embedded on the first modulation symbol.

In aspect 9, the method of any of aspects 1-6 further includes that the information for the second UCI payload is embedded at on a set of coded bits associated with the first codeword, the method further comprising: modulating the first codeword having the embedded information to generate a first modulation symbol, wherein the uplink channel comprises the first modulation symbol.

In aspect 10, the method of any of aspects 1-9 further includes that encoding the second UCI payload to generate a second codeword, wherein embedding the information comprises super-positioning the second codeword on the first codeword.

In aspect 11, the method of any of aspects 1-9 further includes that encoding the second UCI payload to generate a second codeword, wherein embedding the information comprises spreading the first codeword based on the second codeword.

In aspect 12, the method of aspect 11 further includes that spreading the first codeword comprises: repeating the first codeword a number of times; and multiplying each repetition of the first codeword with an element of the second codeword.

In aspect 13, the method of any of aspects 1-12 furtherer includes performing the embedding based on a condition of one or more of the first UCI payload, the second UCI payload, or a type of the uplink channel.

In aspect 14, the method of any of aspects 1-13 further includes applying a type of embedding based on a size of one or more of the first UCI payload and the second UCI payload.

In aspect 15, the method of aspect 13 further includes that the condition comprises the second UCI payload having less than a threshold number of bits.

In aspect 16, the method of aspect 13 further includes that the condition comprises the first UCI payload and the second UCI payload together having less than a threshold number of bits.

In aspect 17, the method of aspect 13 further includes that the condition comprises the first UCI payload having less than a first threshold number of bits and the second UCI payload having less than a second threshold number of bits.

In aspect 18, the method of any of aspects 1-17 further includes transmitting the uplink channel comprising a third UCI payload without embedded UCI information for a fourth UCI payload of the second priority level based on a number of bits of one or more of the third UCI payload or the fourth UCI payload being greater than a threshold number.

In aspect 19, the method of any of any of aspects 1-18 further includes applying a type of embedding based on a channel type, wherein the UE applies a first type of embedding based for transmission on a PUSCH or a second type of embedding for transmission on the uplink channel In aspect 20 the method may further include transmitting the first codeword on a subset of subcarriers on a first set of one or more symbols of the uplink channel, where the first codeword indicates the first UCI, and the set of subcarriers indicate second UCI having a second priority level.

Aspect 21 is the method of aspect 1 or 20, where the first priority level is lower than the second priority level.

Aspect 22 is the method of any of aspects 1, 20, or 21, further including transmitting a DMRS on a second set of one or more symbols of the uplink channel.

Aspect 23 is the method of any of aspects 1 or 20-22, further including transmitting the second UCI on a second set of one or more symbols of the uplink channel.

Aspect 24 is the method of any of aspects 1 or 20-23, where a subcarrier index on which the first UCI is transmitted indicates the information about the second UCI.

Aspect 25 is the method of any of aspects 1 or 20-24 where the subset of subcarriers corresponds to a resource block set.

Aspect 26 is the method of any of aspects 1 or 20-25, where a number of the subset of subcarriers on which the first codeword is transmitted is based on a payload size of the second UCI of the second priority level, where the first UCI is encoded to the first codeword based on the number of the subset of subcarriers.

Aspect 27 is the method of any of aspects 1 or 20-26, where the subset of subcarriers corresponds to a comb index.

Aspect 28 is the method of aspect 22 or 23, further including spreading a signal including the first UCI across a set of subcarriers for each symbol of the first set of one or more symbols.

Aspect 29 is the method of aspect 28, where the first UCI is spread a first number of times, the method further including applying an OCC to the spread signal, the OCC being based on the second UCI.

Aspect 30 is the method of aspect 29, further including performing a DFT after applying the OCC to the spread signal.

Aspect 31 is the method of aspect 27, further including mapping the first UCI to the subset of subcarriers without spreading.

Aspect 32 is the method of any of aspects 1 or 20-31, where the first UCI on the subset of subcarriers indicating the information for the second UCI is transmitted based on a PUCCH format for the PUCCH.

Aspect 33 is the method of aspect 32, where the first UCI on the subset of subcarriers indicating the information for the second UCI is transmitted based on the PUCCH format being based on a DFT-s-OFDM waveform.

Aspect 34 is a method of wireless communication at a UE, the method including encoding first UCI having a first priority level into a first codeword, and transmitting the first codeword on a subset of subcarriers on a first set of one or more symbols of a PUCCH, where the first codeword indicates the first UCI, and the set of subcarriers indicate second UCI having a second priority level.

Aspect 35 is the method of aspect 34, where the first priority level is lower than the second priority level.

Aspect 36 is the method of any of aspects 34 and 35, further including transmitting a DMRS on a second set of one or more symbols of the PUCCH.

Aspect 37 is the method of any of aspects 34 to 36, further including transmitting the second UCI on a second set of one or more symbols of the PUCCH.

Aspect 38 is the method of any of aspects 34 to 37, where a subcarrier index on which the first UCI is transmitted indicates the information about the second UCI.

Aspect 39 is the method of any of aspects 34 to 38, where the subset of subcarriers corresponds to a resource block set.

Aspect 40 is the method of any of aspects 34 to 39, where a number of the subset of subcarriers on which the first codeword is transmitted is based on a payload size of the second UCI of the second priority level, where the first UCI is encoded to the first codeword based on the number of the subset of subcarriers.

Aspect 41 is the method of any of aspects 34 to 40, where the subset of subcarriers corresponds to a comb index.

Aspect 42 is the method of aspect 41, further including spreading a signal including the first UCI across a set of subcarriers for each symbol of the first set of one or more symbols.

Aspect 43 is the method of aspect 42, where the first UCI is spread a first number of times, the method further including applying an OCC to the spread signal, the OCC being based on the second UCI.

Aspect 44 is the method of aspect 43, further including performing a DFT after applying the OCC to the spread signal.

Aspect 45 is the method of aspect 41, further including mapping the first UCI to the subset of subcarriers without spreading.

Aspect 46 is the method of any of aspects 34 to 45, where the first UCI on the subset of subcarriers indicating the information for the second UCI is transmitted based on a PUCCH format for the PUCCH.

Aspect 47 is the method of aspect 46, where the first UCI on the subset of subcarriers indicating the information for the second UCI is transmitted based on the PUCCH format being based on a DFT-s-OFDM waveform.

Aspect 48 is an apparatus for wireless communication including at least one processor coupled to a memory and configured to implement a method as in any of aspects 1 to 47.

Aspect 49 is an apparatus for wireless communication including means for implementing a method as in any of aspects 1 to 47.

Aspect 50 is a non-transitory computer-readable medium storing computer executable code, where the code when executed by a processor causes the processor to implement a method as in any of aspects 1 to 47.

Aspect 51 is a method of wireless communication at a base station, comprising: receiving an uplink channel from a UE, comprising a first codeword for a first UCI payload having a first priority level and having a modification that conveys information for a second UCI payload having a second priority level; and decoding the second UCI payload based at least in part on the information conveyed based on the modification to the first codeword.

In aspect 52, the method of aspect 51 further includes that the first priority level is lower than the second priority level.

In aspect 53, the method of aspect 51 or aspect 52 further includes that the uplink channel comprises a physical uplink shared channel (PUSCH).

In aspect 54, the method of aspect 51 or aspect 52 further includes that the uplink channel comprises a physical uplink control channel (PUCCH).

In aspect 55, the method of any of aspects 51-54 further includes demultiplexing a second codeword for the second UCI payload from the first codeword having the embedded information, wherein the base station decodes the second UCI payload from the second codeword based on the embedded information with the first codeword.

In aspect 56, the method of aspect 55 further includes that the demultiplexing is performed at a bit level, the method further comprising: demodulating a multiplexed combination of the second codeword and the first codeword having the embedded information.

In aspect 57, the method of any of aspects 51-54 further includes demodulating the first codeword from a first modulation symbol after de-embedding the information for the second UCI payload on the first modulation symbol.

In aspect 58, the method of any of aspects 51-54 further includes demodulating the first codeword having the embedded information to de-embed the embedded information for the second UCI payload at a bit level.

In aspect 59, the method of any of aspects 51-58 further includes the embedded information is super-positioned on the first codeword.

In aspect 60, the method of any of aspects 51-58 further includes receiving the first codeword comprises de-spreading the first codeword based on a second codeword for the second UCI payload.

In aspect 61, the method further includes decoding the information about second UCI payload of a second priority level based on the subset of subcarriers on which the first UCI is received.

Aspect 62 is the method of aspect 51 or 61, further includes receiving a DMRS on a second set of one or more symbols of the PUCCH.

Aspect 63 is the method of any of aspects 51 or 61 and 62, where the first priority level is lower than the second priority level.

Aspect 64 is the method of any of aspects 51 or 61 to 63, further including receiving the second UCI on a second set of one or more symbols of the uplink channel, and decoding the second UCI based on the second set of one or more symbols and the subset of subcarriers on which the first UCI is received.

Aspect 65 is the method of any of aspects 51 or 61 to 64, where a subcarrier index on which the first UCI is received indicates the information about the second UCI.

Aspect 66 is the method of any of aspects 51 or 61 to 65, where the subset of subcarriers corresponds to a resource block set.

Aspect 67 is the method of any of aspects 51 or 61 to 66, where the subset of subcarriers corresponds to a comb index.

Aspect 68 is the method of aspect 62, where a signal including the first UCI is spread across a set of subcarriers for each symbol of the first set of one or more symbols.

Aspect 69 is the method of aspect 67, where the first UCI is mapped to the subset of subcarriers without spreading.

Aspect 70 is an apparatus for wireless communication including at least one processor coupled to a memory and configured to implement a method as in any of aspects 51-69.

Aspect 71 is an apparatus for wireless communication including means for implementing a method as in any of aspects 51-69.

Aspect 72 is a non-transitory computer-readable medium storing computer executable code, where the code when executed by a processor causes the processor to implement a method as in any of aspects 51-69.

What is claimed is:

1. An apparatus for wireless communication at a user equipment (UE), comprising:
   memory; and
   at least one processor coupled to the memory and configured to cause the UE to:
     encode a first uplink control information (UCI) payload of a first priority level to generate a first codeword;
     encode a second UCI payload of a second priority level to generate a second codeword;
     modify the first codeword based on the second UCI payload, wherein information about the second UCI payload is conveyed via a modification of the first codeword, and wherein to modify the first codeword the at least one processor is further configured to cause the UE to embed the information about the second UCI payload on the first codeword without dropping the first UCI payload;
     multiplex the second codeword with the first codeword having the embedded information about the second UCI payload; and
     transmit an uplink channel comprising the second codeword and the first codeword having the embedded information about the second UCI payload.

2. The apparatus of claim 1, further comprising:
   at least one transceiver configured to transmit the uplink channel, wherein the first priority level of the first UCI payload is lower than the second priority level of the second UCI payload.

3. The apparatus of claim 1, wherein the uplink channel comprises a physical uplink shared channel (PUSCH) or a physical uplink control channel (PUCCH).

4. The apparatus of claim 1, wherein the at least one processor is further configured to cause the UE to:
modulate a multiplexed combination of the second codeword and the first codeword having the embedded information about the second UCI payload.

5. The apparatus of claim 1, wherein the at least one processor is further configured to cause the UE to:
modulate the first codeword to generate a first modulation symbol prior to embedding the information for the second UCI payload, wherein the information for the second UCI payload is embedded on the first modulation symbol.

6. The apparatus of claim 1, wherein the information for the second UCI payload is embedded on a set of coded bits associated with the first codeword, wherein the at least one processor is further configured to cause the UE to:
modulate the first codeword having the embedded information about the second UCI payload to generate a first symbol, wherein the uplink channel comprises the first symbol.

7. The apparatus of claim 1, wherein to embed the information the at least one processor is further configured to cause the UE to super-position the second codeword on the first codeword.

8. The apparatus of claim 1, wherein to embed the information the at least one processor is further configured to cause the UE to spread the first codeword based on the second codeword, wherein to spread the first codeword the at least one processor is further configured to cause the UE to repeat the first codeword a number of times and multiply each repetition of the first codeword with an element of the second codeword.

9. The apparatus of claim 1, wherein the at least one processor is further configured to cause the UE to:
perform embedding based on a condition of one or more of the first UCI payload, the second UCI payload, or a type of the uplink channel.

10. The apparatus of claim 9, wherein the at least one processor is further configured to cause the UE to:
apply an embedding type based on a size of one or more of the first UCI payload and the second UCI payload.

11. The apparatus of claim 9, wherein the condition comprises at least one of:
the second UCI payload having less than a first threshold number of bits,
the first UCI payload and the second UCI payload together having less than a second threshold number of bits, or
the first UCI payload having less than the second threshold number of bits and the second UCI payload having less than the first threshold number of bits.

12. The apparatus of claim 9, wherein the at least one processor is further configured to cause the UE to:
transmit the uplink channel comprising a third UCI payload without embedded UCI information for a fourth UCI payload of the second priority level based on a number of bits of one or more of the third UCI payload or the fourth UCI payload being greater than a threshold number.

13. The apparatus of claim 9, wherein the at least one processor is further configured to cause the UE to:
apply an embedding type based on a channel type, wherein the UE applies a first type of embedding based for transmission on a physical uplink shared channel (PUSCH) or a second type of embedding for transmission on a physical uplink control channel (PUCCH).

14. The apparatus of claim 1, wherein to modify the first codeword to convey the information about the second UCI, the at least one processor is configured to cause the UE to map the first codeword on a subset of subcarriers on a first set of one or more symbols of the uplink channel, wherein the first codeword indicates the first UCI payload, and the subset of subcarriers indicate second UCI having the second priority level.

15. The apparatus of claim 14, wherein the at least one processor is further configured to cause the UE to:
transmit a demodulation reference signal (DMRS) on a second set of one or more symbols of the uplink channel; or
transmit the second UCI on a second set of one or more symbols of the uplink channel.

16. The apparatus of claim 14, wherein a subcarrier index on which the first UCI payload is transmitted indicates the information about the second UCI.

17. The apparatus of claim 14, wherein the subset of subcarriers corresponds to a resource block set.

18. The apparatus of claim 14, wherein a number of the subset of subcarriers on which the first codeword is transmitted is based on a payload size of the second UCI of the second priority level, wherein the first UCI payload is encoded to the first codeword based on the number of the subset of subcarriers.

19. The apparatus of claim 14, wherein the subset of subcarriers corresponds to a comb index.

20. The apparatus of claim 14, wherein the at least one processor is further configured to cause the UE to:
spread a signal comprising first UCI across a set of subcarriers for each symbol of the first set of one or more symbols, wherein the first UCI is spread a first number of times;
apply an orthogonal cover code (OCC) to a spread signal, the OCC being based on the second UCI; and
perform a Discrete Fourier Transform (DFT) after applying the OCC to the spread signal.

21. The apparatus of claim 19, wherein the at least one processor is further configured to cause the UE to:
map first UCI to the subset of subcarriers without spreading.

22. The apparatus of claim 14, wherein the at least one processor is further configured to cause the UE to transmit the first UCI payload on the subset of subcarriers indicating the information for the second UCI payload based on a PUCCH format for the uplink channel being based on a discrete Fourier transform (DFT) spread OFDM (DFT-s-OFDM) waveform.

23. The apparatus of claim 1, wherein the first UCI payload has a lower priority level than the second UCI payload, and wherein the at least one processor is configured to cause the UE to transmit the uplink channel comprising both the second codeword and the first codeword having the embedded information about the second UCI payload without dropping the first UCI payload having the lower priority level.

24. A method of wireless communication at a user equipment (UE), comprising:
encoding a first uplink control information (UCI) payload of a first priority level to generate a first codeword;
encoding a second UCI payload of a second priority level to generate a second codeword;
modifying the first codeword based on the second UCI payload, wherein information about the second UCI payload is conveyed via a modification of the first codeword, and wherein modifying the first codeword comprises embedding the information about the second UCI payload on the first codeword without dropping the first UCI payload;

multiplexing the second codeword with the first codeword having the embedded information about the second UCI payload; and transmitting an uplink channel comprising the second codeword and the first codeword having the embedded information about the second UCI payload.

25. An apparatus for wireless communication at a base station, comprising:
  memory; and
  at least one processor coupled to the memory and configured to cause the base station to:
    receive an uplink channel from a user equipment (UE), comprising a first codeword for a first uplink control information (UCI) payload having a first priority level and having a modification that conveys information for a second UCI payload having a second priority level, wherein the information for the second UCI payload is embedded with the first UCI payload in the first codeword without dropping the first UCI payload, and wherein the first codeword having the embedded information for the second UCI payload is multiplexed in the uplink channel with a second codeword that includes the second UCI payload; and
    decode the first UCI payload based at least in part on the first codeword and the second UCI payload based at least in part on the second codeword and the information conveyed based on the modification of the first codeword.

26. The apparatus of claim 25, further comprising:
  at least one transceiver configured to receive the uplink channel, wherein the first priority level is lower than the second priority level.

27. The apparatus of claim 25, wherein the at least one processor is further configured to cause the base station to:
  demultiplex the second codeword for the second UCI payload at a bit level from the first codeword having embedded information for the second UCI payload, wherein the base station is configured to decode the second UCI payload from the second codeword based on the information embedded with the first codeword.

28. The apparatus of claim 25, wherein the at least one processor is further configured to cause the base station to:
  demodulate the first codeword from a first modulation symbol after de-embedding the information for the second UCI payload on the first modulation symbol, or
  demodulate the first codeword having the embedded information for the second UCI payload to de-embed the information for the second UCI payload at a bit level.

29. The apparatus of claim 25, wherein to decode the second UCI payload the at least one processor is configured to cause the base station to decode the information about the second UCI payload of the second priority level based on a subset of subcarriers on which the first UCI payload is received.

30. A method of wireless communication at a base station, comprising:
  receiving an uplink channel from a user equipment (UE), comprising a first codeword for a first uplink control information (UCI) payload having a first priority level and having a modification that conveys information for a second UCI payload having a second priority level, wherein the information for the second UCI payload is embedded with the first UCI payload in the first codeword without dropping the first UCI payload, and wherein the first codeword having the embedded information for the second UCI payload is multiplexed in the uplink channel with a second codeword that includes the second UCI payload; and
  decoding the first UCI payload based at least in part on the first codeword and the second UCI based at least in part on the second codeword and the information conveyed based on the modification of the first codeword.

* * * * *